US012699779B1

(12) United States Patent　　　(10) Patent No.: US 12,699,779 B1

Liu et al.　　　(45) Date of Patent: Aug. 4, 2026

(54) AUTOMATED SOFTWARE VULNERABILITY ASSESSMENT USING GENERATIVE ARTIFICIAL INTELLIGENCE

(71) Applicant: SAP SE, Walldorf (DE)

(72) Inventors: Chao Liu, Xi'an (CN); Lan Luan, Xi'an (CN); Khaldoun Bouhsas, Walldorf (DE); Yong Li, Xi'an (CN); Jinming Lv, Xi'an (CN); Qiao-luan Xie, Xi'an (CN); Andreas Eisenmann, Walldorf (DE)

(73) Assignee: SAP SE, Waldorf (DE)

( * ) Notice: Subject to any disclaimer, the term of this patent is extended or adjusted under 35 U.S.C. 154(b) by 35 days.

(21) Appl. No.: 19/043,063

(22) Filed: Jan. 31, 2025

(51) Int. Cl.
　　*G06F 21/00*　　(2013.01)
　　*G06F 21/57*　　(2013.01)

(52) U.S. Cl.
　　CPC ...... *G06F 21/577* (2013.01); *G06F 2221/033* (2013.01)

(58) Field of Classification Search
　　CPC ............ G06F 21/577; G06F 2221/033; G06F 16/3344; G06N 3/0475
　　See application file for complete search history.

(56) References Cited

U.S. PATENT DOCUMENTS 10,628,764 B1 * 4/2020 Kaplan .......... G06Q 10/063112
2017/0357809 A1 * 12/2017 Smith .............. G06Q 10/06398

2022/0156383 A1 * 5/2022 Schwarzbauer ...... G06F 21/566
2023/0012722 A1 * 1/2023 Del Rosario ............ G06N 3/02
2023/0259705 A1 * 8/2023 Tunstall-Pedoe .... G06N 3/0499
　　　　　　　　　　　　　　　　　　　　704/9
2024/0330480 A1 * 10/2024 Roytman .............. G06F 16/334
2025/0356005 A1 * 11/2025 Soliman ................ G06F 21/554
2026/0100964 A1 * 4/2026 Richard .............. H04L 63/1433

FOREIGN PATENT DOCUMENTS

WO　　WO 2023/092511　　6/2023

OTHER PUBLICATIONS

Extended European Search Report, European Application No. 25225472.7, 9 pages, Mar. 9, 2026.

(Continued)

*Primary Examiner* — Yogesh Paliwal
(74) *Attorney, Agent, or Firm* — Klarquist Sparkman, LLP

(57)　　　　　ABSTRACT

A computer-implemented method can receive a vulnerability report for a software. The vulnerability report specifies a vulnerable library used by the software and a path of the vulnerable library within the software. The method can generate a summary of the vulnerability report using a generative artificial intelligence (AI) model, retrieve, from a bug report database, a set of relevant bug reports specifying the vulnerable library, generate a synopsis for the set of relevant bug reports using the generative AI model, generate multiple preliminary decisions on validity of the vulnerability report using the generative AI model based on the summary of the vulnerability report and the synopsis for the set of relevant bug reports, and generate a final decision on validity of the vulnerability report based on the multiple preliminary decisions. Related systems and software for implementing the method are also disclosed.

20 Claims, 9 Drawing Sheets

Receive a vulnerability report specifying a vulnerable library for a software. 310

Generate a summary of the vulnerability report. 320

Retrieve a set of relevant bug reports specifying the vulnerable library. 330

Generate a synopsis for the set of relevant bug reports. 340

Generate multiple preliminary decisions on validity of the vulnerability report. 350

Generate a final decision on validity of the vulnerability report. 360

300

(56)            References Cited

OTHER PUBLICATIONS

Mohajer et al., "SkipAnalyzer: An Embodied Agent for Code Analysis with Large Language Models," ARXIV.org, arXiv:2310.18532v1, 5 pages, Oct. 27, 2023.
Black Duck Binary Analysis, https://www.blackduck.com/software-composition-analysis-tools/binary-analysis.html, 6 pages (downloaded Dec. 4, 2024).
NVD, "Understanding Vulnerability Detail Pages," https://nvd.nist.gov/vuln, 2 pages (downloaded Dec. 4, 2024).
BlackDuck, "2024 Open Source Security and Risk Analysis Report, Your guide to securing your open source supply chain," 18 pages, 2024.
Jo et al., "Vulcan: Automatic extraction and analysis of cyber threat intelligence from unstructured text," *Computers & Security* 120, 102763, 2022.
Haryono et al., "Automated Identification of Libraries from Vulnerability Data: Can We Do Better?," *30th IEEE/ACM International Conference on Program Comprehension*, May 21-22, 2022, pp. 178-189.
Ponta et al., "Beyond Metadata: Code-centric and Usage-based Analysis of Known Vulnerabilities in Open-source Software," *2018 IEEE International Conference on Software Maintenance and Evolution*, pp. 449-460, 2018.
Lyu et al., "CHRONOS: Time-Aware Zero-Shot Identification of Libraries from Vulnerability Reports," arXiv:2301.03944v4, 14 pages (downloaded Jul. 29, 2023).
Anwar et al., "Cleaning the NVD: Comprehensive Quality Assessment, Improvements, and Analyses," *Proceedings of ACM Conference*, Jul. 2017, 13 pages.
Ponta et al., "Detection, assessment and mitigation of vulnerabilities in open source dependencies," *Empirical Software Engineering*, https://doi.org/10.1007/s10664-020-09830-x, 41 pages, Jun. 30, 2020.
Pearce et al., "Examining Zero-Shot Vulnerability Repair with Large Language Models," arXiv:2112.02125v3, 18 pages (downloaded Aug. 15, 2022).
Chen et al., "Identifying Vulnerable Third-Party Java Libraries from Textual Descriptions of Vulnerabilities and Libraries," *Association for Computing Machinery*, 23 pages, Nov. 2023.
Fernando et al., Google DeepMind, "Promptbreeder: Self-Referential Self-Improvement Via Prompt Evolution," arXiv:2309.16797v1, 64 pages (downloaded Sep. 28, 2023).

\* cited by examiner

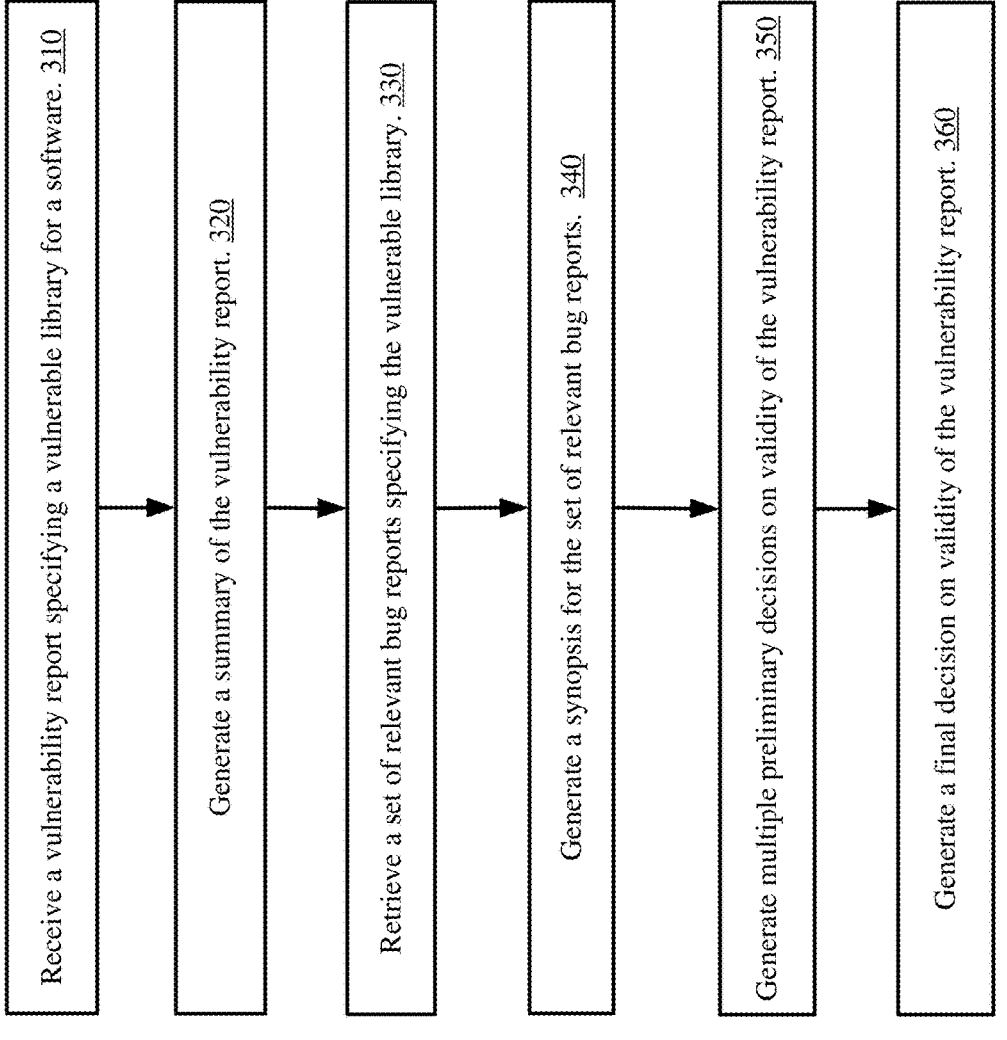

Receive a vulnerability report specifying a vulnerable library for a software. 310

Generate a summary of the vulnerability report. 320

Retrieve a set of relevant bug reports specifying the vulnerable library. 330

Generate a synopsis for the set of relevant bug reports. 340

Generate multiple preliminary decisions on validity of the vulnerability report. 350

Generate a final decision on validity of the vulnerability report. 360

Figure 7:
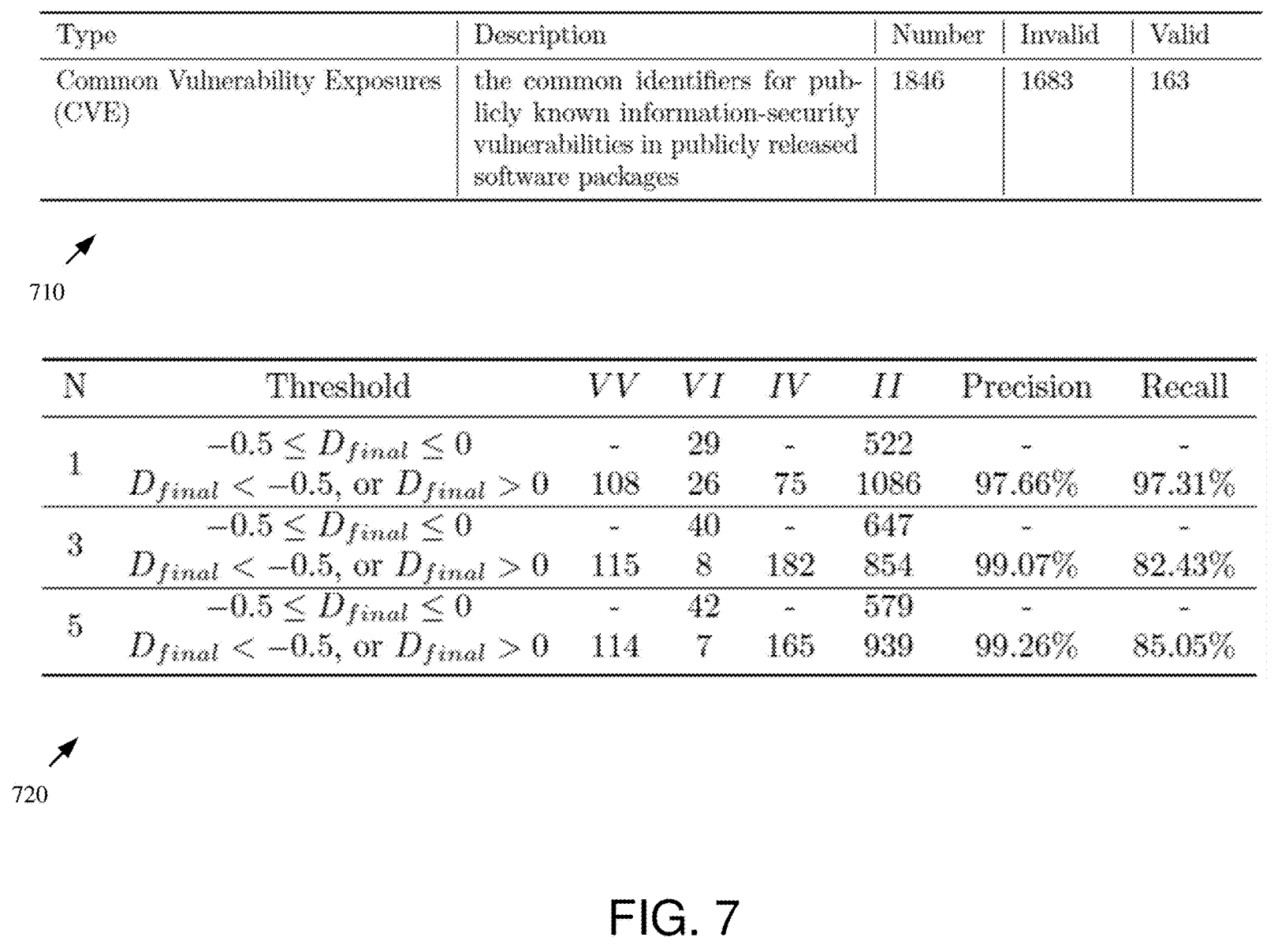

| Type | Description | Number | Invalid | Valid |
|---|---|---|---|---|
| Common Vulnerability Exposures (CVE) | the common identifiers for publicly known information-security vulnerabilities in publicly released software packages | 1846 | 1683 | 163 |

710

| N | Threshold | VV | VI | IV | II | Precision | Recall |
|---|---|---|---|---|---|---|---|
| 1 | $-0.5 \leq D_{final} \leq 0$ | - | 29 | - | 522 | - | - |
|   | $D_{final} < -0.5$, or $D_{final} > 0$ | 108 | 26 | 75 | 1086 | 97.60% | 97.31% |
| 3 | $-0.5 \leq D_{final} \leq 0$ | - | 40 | - | 647 | - | - |
|   | $D_{final} < -0.5$, or $D_{final} > 0$ | 115 | 8 | 182 | 854 | 99.07% | 82.43% |
| 5 | $-0.5 \leq D_{final} \leq 0$ | - | 42 | - | 570 | - | - |
|   | $D_{final} < -0.5$, or $D_{final} > 0$ | 114 | 7 | 165 | 939 | 99.26% | 85.05% |

AUTOMATED SOFTWARE VULNERABILITY ASSESSMENT USING GENERATIVE ARTIFICIAL INTELLIGENCE

BACKGROUND

Development of software, particularly open-source software (OSS), has driven advancements in transparency, innovation, and community collaboration, offering substantial benefits to the software industry. However, it also introduces challenges, notably the increasing discovery and disclosure of vulnerabilities within the software. Software vulnerabilities are security weaknesses that, if exploited, can compromise systems and data. Existing technologies aim to automatically detect these vulnerabilities (e.g., producing vulnerability reports) but often struggle to accurately assess their validity, frequently producing false positives. This results in substantial resource wastage, as developers must manually evaluate numerous invalid vulnerability reports. Thus, room for improvements exists for enhancing the accuracy and efficiency of vulnerability assessment methodologies.

BRIEF DESCRIPTION OF THE DRAWINGS

FIG. 3 is a flowchart illustrating an example overall method for automated software vulnerability assessment.

FIG. 7 shows example experimental results.

DETAILED DESCRIPTION

Overview of Software Vulnerability Assessment

Figure 1:
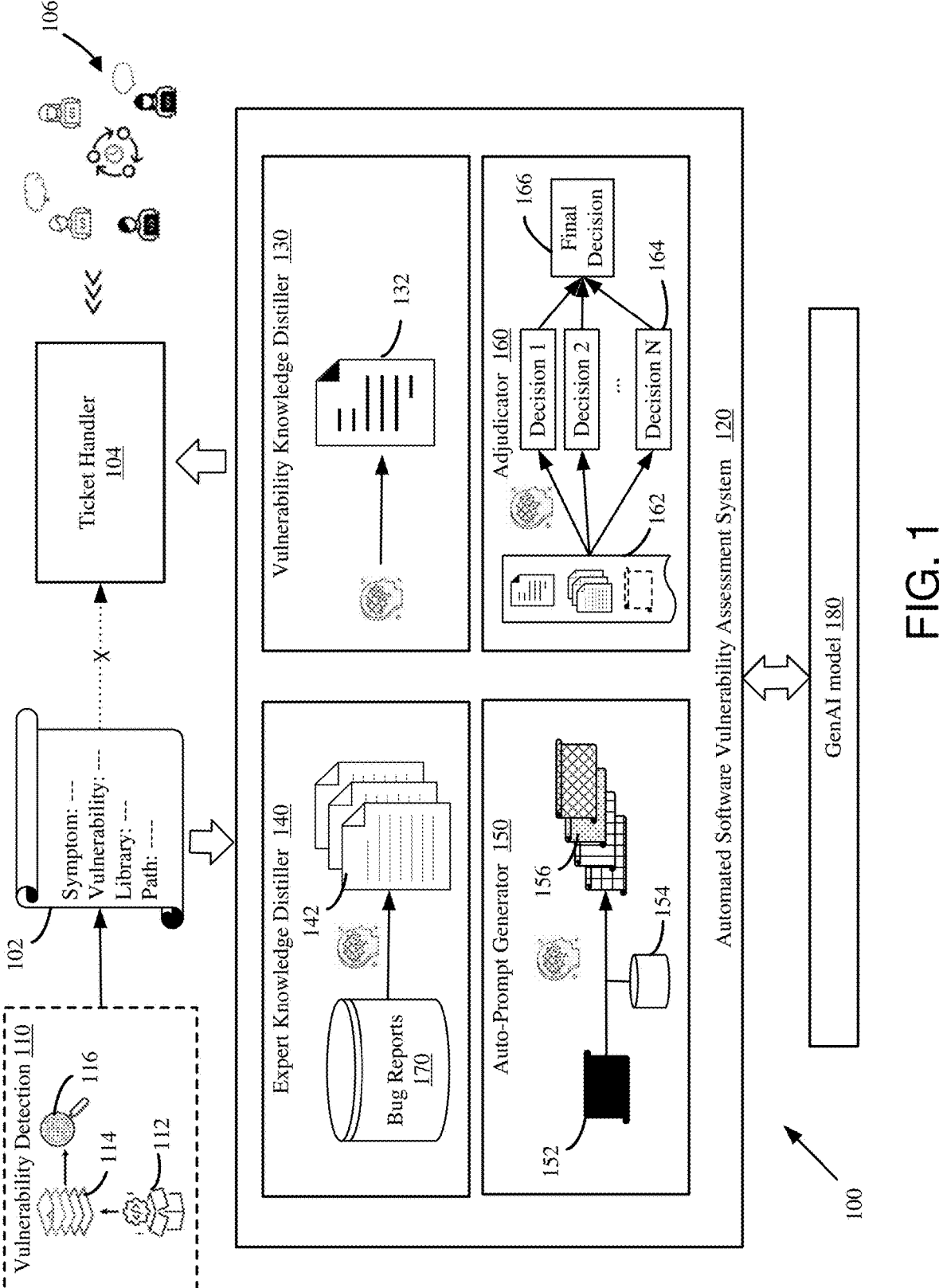
FIG. 1 is a block diagram depicting an overall framework for the automated software vulnerability assessment technologies disclosed herein.

Detecting software vulnerabilities is a critical component of maintaining secure, stable, and reliable systems in today's interconnected digital landscape. Vulnerabilities encompass not only security weaknesses or flaws that can expose systems to unauthorized access or malicious exploitation but also other defects, such as software bugs, that can lead to crashes, degraded performance, or other undesirable behaviors. These issues can disrupt business operations, compromise user experience, and undermine trust in software systems. As software ecosystems grow more complex, particularly with the increasing reliance on open-source software (OSS), the timely identification and mitigation of such vulnerabilities are essential to ensuring operational continuity and data integrity. The widespread adoption of OSS libraries further amplifies this need, as their public availability increases the likelihood of both malicious and unintentional flaws being discovered and exploited or causing unintended disruptions.

Existing technologies for automatic detection of software vulnerabilities rely heavily on databases that serve as repositories for discovered vulnerabilities. These databases, such as the National Vulnerability Database (NVD) maintained by the National Institute of Standards and Technology (NIST), provide a centralized source of information on identified vulnerabilities, including unique identifiers, severity scores, affected software components and versions, and detailed vulnerability descriptions. The NVD, for instance, uses the Common Vulnerabilities and Exposures (CVE) system to catalog vulnerabilities, facilitating their identification and remediation across the software ecosystem.

Building on this foundation, current vulnerability detection technologies utilize various methodologies to scan and analyze codebases for vulnerabilities. For example, named-entity-recognition (NER)-based approaches extract entities from vulnerability descriptions in these repositories and match them with software library names, enabling direct associations between vulnerabilities and specific components. As another example, extreme multi-label learning (XML)-based approaches apply artificial intelligence (AI) or machine learning classifiers trained on labeled datasets to map vulnerability descriptions to their corresponding libraries. These techniques form the backbone of existing open-source tools such as OWASP Dependency Check and Retire.js, and commercial tools such as Mend (formerly WhiteSource) and Black Duck Binary Analysis (BDBA), which are designed to identify known vulnerabilities in software systems and generate vulnerability reports.

Despite these advancements, significant shortcomings persist. Current vulnerability detection tools often rely on metadata associated with OSS libraries and vulnerability descriptions, which are frequently incomplete, inconsistent, or outdated. This leads to high false-positive rates, where vulnerabilities are reported inaccurately, requiring substantial manual effort to validate and address. Additionally, the complex dependencies inherent in modern software systems exacerbate these issues, making it challenging to distinguish between valid and invalid software vulnerability reports. For instance, historical analysis of vulnerability reports in large-scale software development environments reveals that over 96% of reported software vulnerabilities may be invalid, resulting in wasted resources and delayed remediation efforts.

The technologies described herein address many of the above challenges by implementing an automated software vulnerability assessment system that leverages generative artificial intelligence (GenAI) to validate vulnerability reports generated by existing software vulnerability detection tools. By distinguishing between valid (true) and invalid (false) vulnerabilities, the disclosed system can reduce wasted resources on analyzing false reports, enabling teams to focus on true vulnerabilities and enhance security and efficiency. While OSS is used as an illustrative example, the disclosed technologies are equally applicable to non-open-source software.

Example Framework for Automated Software Vulnerability Assessment

FIG. 1 depicts an overall framework 100 for automated software vulnerability assessment, according to the technologies disclosed herein.

Within the framework 100, vulnerability detection 110 involves using an existing tool 116 (e.g., BDBA or the like) to detect vulnerability of a software 112. The software 112 may include methods or functions 114 that are part of vulnerable libraries, which have been identified as having vulnerabilities according to an existing vulnerability database (e.g., NVD or the like). The tool 116 can scan the software 112 and generate one or more vulnerability reports 102 according to a specific format. Each vulnerability report 102 can include details of at least one detected software vulnerability, such as the identified vulnerable library and affected versions, the path to the vulnerable library within the software's codebase, associated symptoms, and optionally some other relevant information (e.g., suggested resolutions or mitigations, examples, etc.).

Conventionally, the vulnerability report 102 generated by the tool 116 is directly sent to a ticket handler 104, generating a "ticket" for troubleshooting. The ticket handler 104 is a centralized bug tracking or ticketing system (e.g., Bugzilla or the like) where a technical support team 106 can evaluate the report 102 and assess the vulnerabilities of the software 112. However, this process is inefficient due to the large number of invalid (false) reports 102 (e.g., for complex software development, the tool 116 may generate hundreds or thousands of vulnerability reports each day), leading to wasted resources as the support team 106 must manually review and dismiss non-existent vulnerabilities, delaying resolution of true vulnerabilities.

According to the disclosed technology, instead of being sent to the ticket handler 104, the vulnerability report 102 is directed to an automated software vulnerability assessment system 120, which includes four components: a vulnerability knowledge distiller 130, an expert knowledge distiller 140, an auto-prompt generator 150, and an adjudicator 160. The automated software vulnerability assessment system 120 can communicate with a GenAI model 180, which can be hosted externally, e.g., on a third-party platform.

Alternatively, the GenAI model 180 can be deployed locally, e.g., on the automated software vulnerability assessment system 120.

Each of the components (130, 140, 150, and 160) can be powered by the GenAI model 180. Specifically, the vulnerability knowledge distiller 130 is configured to use the GenAI model 180 to automatically extract, in real-time, information from the vulnerability report 102 and generate a vulnerability summary 132.

The expert knowledge distiller 140 is configured to automatically retrieve in real-time, from a bug reports database 170 (also referred to as tickets database), a set of relevant bug reports specifying the vulnerable library identified by the vulnerability report 102. The bug report database 170 can store a collection of bug reports (or tickets) previously generated by the support team 106. Each bug report can include descriptions, diagnosis, resolutions, and other analysis for a vulnerability report or ticket generated by the tool 116 when scanning a historical software (which may be the same software 112 or a different software). The retrieved relevant bug reports provide domain-specific insights from relevant historical data (e.g., discussions, analysis, and evaluations by the support team 106 for similar vulnerability reports in the past). The expert knowledge distiller 140 can then use the GenAI model 180 to automatically generate, in real-time, a synopsis 142 for the set of relevant bug reports (also referred to as "tickets summary"). Although FIG. 1 shows the bug report database 170 inside the expert knowledge distiller 140, in other examples, the bug report database

170 can be located outside the expert knowledge distiller 140 (e.g., external to the automated software vulnerability assessment system 120).

Based on predefined thinking paradigms 154 (also referred to as "thinking styles"), the auto-prompt generator 150 is configured to use the GenAI model 180 to create multiple muted prompts 156, also referred to as derived prompts or refined prompts, from a base prompt, also referred to as a meta-prompt 152. As described more fully below, each muted prompt 156 provides a different perspective than the meta-prompt 152 in guiding the generative behavior of the GenAI model 180.

The adjudicator 160 can utilize the results of the other three components to decide the validity of the vulnerability report 102. Specifically, the adjudicator 160 is configured to automatically generate a plurality prompts 162 based on the multiple muted prompts 156, and optionally, the meta-prompt 152 as well. Each prompt 162 can incorporate the vulnerability summary 132 (generated by the vulnerability knowledge distiller 130) and the synopsis 142 for the set of relevant bug reports (generated by the expert knowledge distiller 140). Using the plurality of prompts 162, the adjudicator 160 can separately prompt the GenAI model 180 to generate, in real-time, a plurality of preliminary decisions 164 on validity of the vulnerability report 102. Then, the adjudicator 160 can use a majority-voting mechanism (e.g., calculating a weighted sum of the plurality of preliminary decisions 164) to obtain a final decision 166 on validity of the vulnerability report 102.

This final decision 166, which can indicate that the vulnerability report 102 is valid or invalid (and in some circumstances indeterministic), can then be forwarded to the ticket handler 104 for the support team 106 to perform further analysis.

Thus, the framework 100 can significantly reduce the burden on the support team 106 by filtering out false vulnerabilities early in the process, e.g., no ticket is generated for vulnerability reports that are determined to be invalid.

Example Overall Automated Software Vulnerability Assessment System

Figure 2:
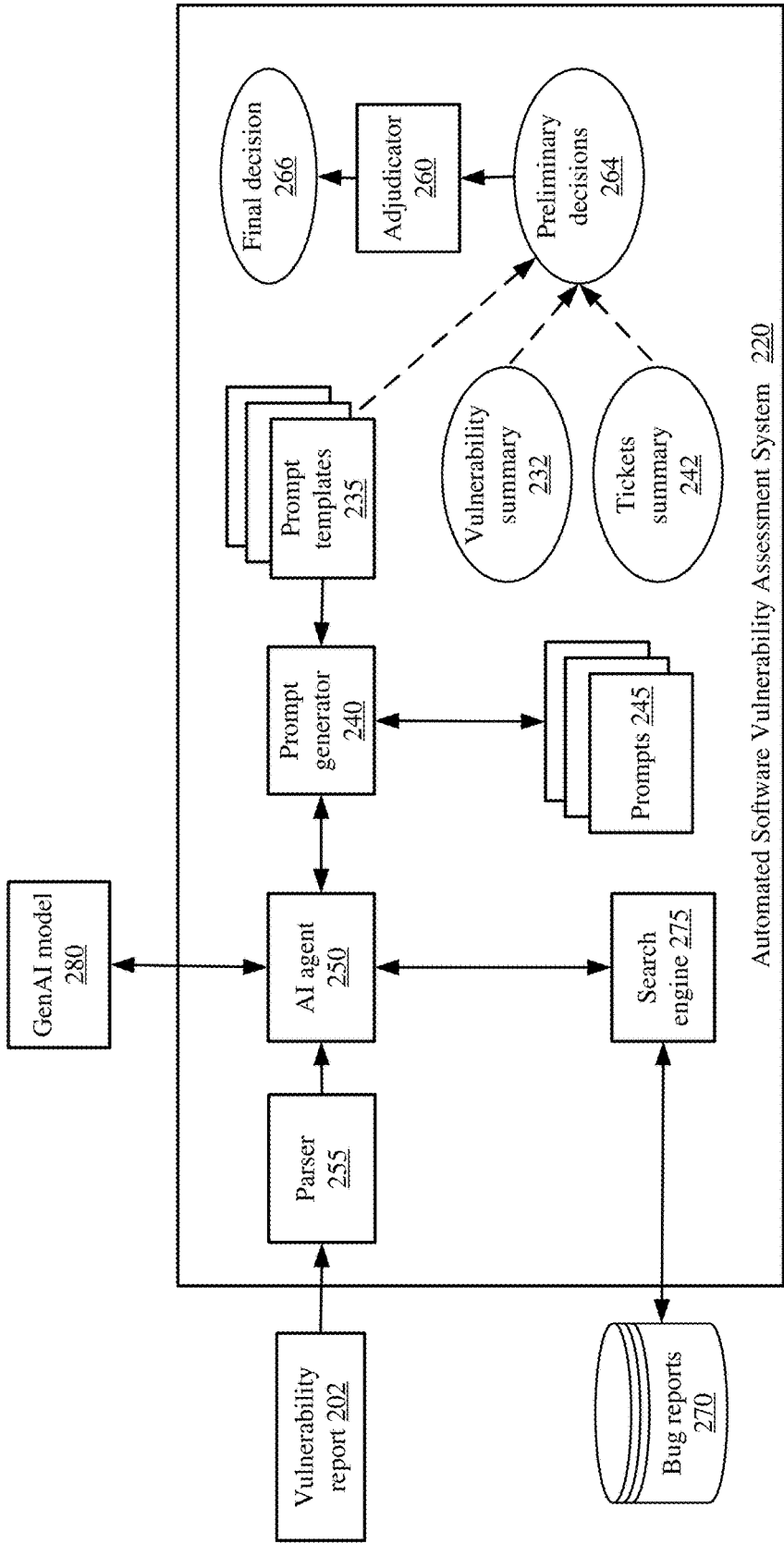
FIG. 2 is an overall block diagram depicting an example automated software vulnerability assessment system.

FIG. 2 shows an overall block diagram of an automated software vulnerability assessment system 220, which can be an example embodiment of the automated software vulnerability assessment system 120 of FIG. 1.

The system 220 is configured to automatically determine (in runtime) validity of a vulnerability report 202 for a software. As noted above, the vulnerability report 202 can by generated by another tool designed to detect vulnerability of the software based on an existing vulnerability database (e.g., NVD or the like), and the vulnerability report 202 can identify a vulnerable library used by the software and a path of the vulnerable library within the software. As shown in FIG. 2, the automated software vulnerability assessment system 220 includes a parser 255, an AI agent 250, a prompt generator 240, a search engine 275, and an adjudicator 260, each of which can be implemented as a software module, a hardware module, a firmware module, or the combination thereof.

The AI agent 250 communicates with a GenAI model 280 (similar to the GenAI model 180 of FIG. 1). For example, the AI agent 250 can send prompts to, and receive responses from, the GenAI model 280. The prompt generator 240 can be configured to generate, in runtime, various prompts 245 based on different prompt templates 235 maintained by the system 220.

The AI agent 250 can be configured to coordinate various interactions between the system 220 and the GenAI model 280, including, e.g., distilling vulnerability knowledge from the vulnerability report 202, distilling expert knowledge from relevant bug reports or tickets stored in a bug report database 270 (similar to the bug report database 170 of FIG. 1), generating multiple muted prompts based on a meta-prompt, and generating a plurality of preliminary decisions on validity of the vulnerability report 202, as described above.

For example, after receiving the vulnerability report 202, the parser 255 can extract various fields within the vulnerability report 202, and provide the extracted fields information to the AI agent 250. The AI agent 250 can instruct the prompt generator 240 to generate, in runtime, a vulnerability knowledge distillation prompt based on one of the prompt templates 235, incorporating the fields information extracted by the parser 255. The generated prompt can include instructions for the GenAI model 280 to extract, from the vulnerability report 202, vulnerability information of the vulnerability library used by the software. The AI agent 250 can then prompt the GenAI model 280 with the vulnerability knowledge distillation prompt, and receive a response from the GenAI model 280 which provides a vulnerability summary 232 for the vulnerability report 202.

The AI agent 250 can also instruct the search engine 275 to retrieve, from the bug report database 270, a set of relevant bug reports specifying the vulnerable library identified by the vulnerability report 202. Additional details for retrieving relevant bug reports are described more fully below. Then, the AI agent 250 can instruct the prompt generator 240 to generate, in runtime, an expert knowledge distillation prompt based on another one of the prompt templates 235. The generated expert knowledge distillation prompt includes instructions for the GenAI model 280 to extract, from the set of relevant bug reports, a tickets summary 242 or synopsis for the set of relevant bug reports. Then, the AI agent 250 can prompt the GenAI model 280 with the expert knowledge distillation prompt, and receive a response from the GenAI model 280 which provides the tickets summary 242 or synopsis for the set of relevant bug reports.

In some examples, at least one of the prompt templates 235 can be a meta-prompt. The AI agent 250 can use auto-prompt engineering technique to derive multiple muted prompts from the meta-prompt. Specifically, the AI agent 250 can instruct the prompt generator 240 to generate multiple muted prompts based on another one of the prompt templates 235. Each muted prompt includes instructions for the GenAI model 280 to generate a muted prompt based on the meta-prompt using a specific thinking paradigm or thinking style. Then, the AI agent 250 can prompt the GenAI model 280 with each muted prompt, and receive a corresponding muted prompt generated by the GenAI model 280 in response. The multiple muted prompts generated by the GenAI model 280 can also be stored as prompt templates 235 (like the meta-prompt).

Additionally, the AI agent 250 can instruct the prompt generator 240 to generate a plurality of decision prompts using the multiple muted prompts and the meta-prompt as prompt templates. In other words, a decision prompt can be generated from the meta-prompt, or from one muted prompt representing a specific thinking style. Each decision prompt includes instructions for the GenAI model 280 to generate a preliminary decision 264 on validity of the vulnerability report 202 based on the vulnerability summary 232 and tickets summary 242 described above. Each preliminary decision 264 can yield a binary classification for the vulnerability report 202: valid or invalid. Additionally, each preliminary decision 264 can include evidentiary support or reasoning information for the classification, e.g., indicating which and how many relevant bug reports are relied on by the GenAI model 280 to generate the valid or invalid classification result.

Then, the adjudicator 260 can generate a final decision 266 based on the plurality of preliminary decisions 264. In some examples, the adjudicator 260 can employ a majority voting mechanism, e.g., by calculating a weighted sum of the multiple preliminary decisions. In some examples, the weight for each preliminary decision can be determined based on how many relevant bug reports, among the set of relevant bug reports, are found by the GenAI model 280 to support the preliminary decision. In some examples, the final decision 266 can indicate that the vulnerability report 202 is valid, invalid, or indeterministic. In some examples, vulnerability reports that are deemed invalid will not generate tickets, whereas vulnerability reports that are deemed valid or indeterministic can be sent to a ticket handler for further investigation.

In practice, the systems shown herein, such as the automated software vulnerability assessment systems 120 and 220, can vary in complexity, with additional functionality, more complex components, and the like. For example, there can be additional functionality within the system 120 or 220. Additional components can be included to implement security, redundancy, load balancing, report design, data logging, and the like.

The described computing systems can be networked via wired or wireless network connections, including the Internet. Alternatively, systems can be connected through an intranet connection (e.g., in a corporate environment, government environment, or the like).

The systems 120 or 220 and any of the other systems described herein can be implemented in conjunction with any of the hardware components described herein, such as the computing systems described below (e.g., processing units, memory, and the like). In any of the examples herein, vulnerability reports, bug reports, prompt templates, prompts, vulnerability summary, tickets summary, and the like can be stored in one or more computer-readable storage media or computer-readable storage devices. The technologies described herein can be generic to the specifics of operating systems or hardware and can be applied in any variety of environments to take advantage of the described features.

Example Overall Method for Automated Software Vulnerability Assessment

FIG. 3 is a flowchart illustrating an example overall method 300 for performing automated software vulnerability assessment. The method 300 can be performed, e.g., by the automated software vulnerability assessment system 120 or 220.

At step 310, the method receives a vulnerability report for a selected software. The vulnerability report specifies a vulnerable library used by the selected software and a path of the vulnerable library within the selected software.

At step 320, the method can generate, in runtime, a summary of the vulnerability report using a GenAI model (e.g., 180 or 280).

In some examples, generating the summary of the vulnerability report includes generating a vulnerability knowledge distillation prompt based on a first prompt template, and prompting the GenAI model with the vulnerability knowledge distillation prompt. The first prompt template can include instructions for the GenAI model to extract, from the vulnerability report, vulnerability information of the vulnerability library used by the selected software.

At step 330, the method can automatically retrieve, from a bug report database (e.g., 170 or 270), a set of relevant bug reports specifying the vulnerable library.

In some examples, the act of retrieving includes searching the bug report database to identify a collection of bug reports for one or more historical software, and identifying, from the collection of bug reports, the set of relevant bug reports. In various examples, the bug report for a historical software specifies the vulnerability library used by the historical software and a path of the vulnerability library within the historical software.

In some examples, the act of identifying includes comparing the path of the vulnerable library within the selected software with the path of the vulnerability library within the historical software.

In some examples, the act of identifying further includes adding the bug report for the historical software to the set of relevant bug reports if (i) the path of the vulnerability library within the historical software contains the path of the vulnerable library within the selected software, and (ii) a count of bug reports in the set of relevant bug reports is smaller than a predefined number.

Responsive to determining that the count of bug reports in the set of relevant bug reports is smaller than the predefined number after evaluating the collection of bug reports, the method can iteratively compare a sub-path of the vulnerable library within the selected software with the path of the vulnerability library within the historical software. In various examples, the sub-path can be derived by removing a prefix from the path of the vulnerable library within the selected software.

Figure 6:
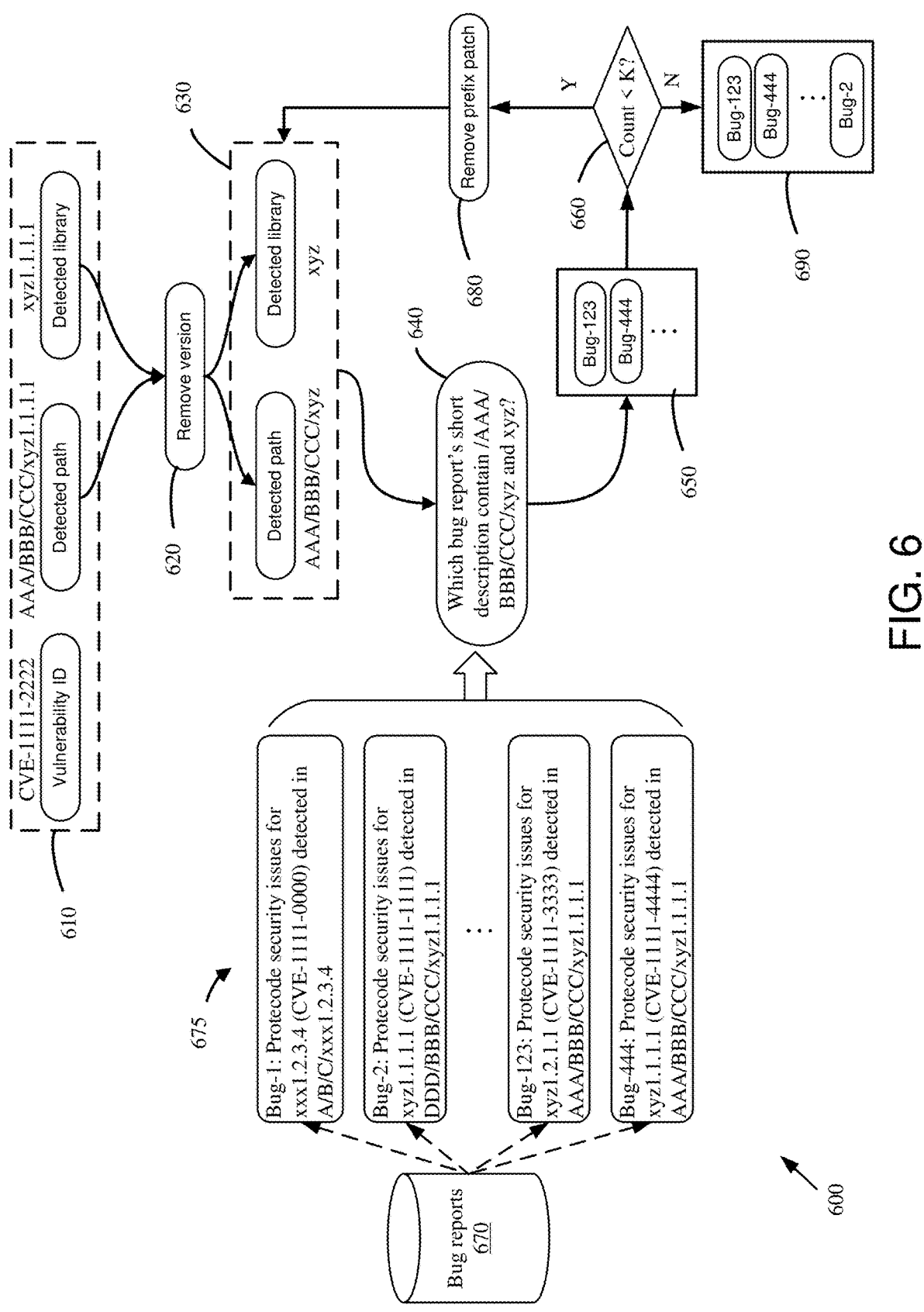
FIG. 6 is a flow diagram depicting an example process of retrieving a set of relevant bug reports from a bug reports database.

Additional details for an example method of retrieving a set of relevant bug reports are shown in FIG. 6 and described further below.

At step 340, the method can generate, in runtime, a synopsis for the set of relevant bug reports using the GenAI model.

In some examples, generating the synopsis can include generating an expert knowledge distillation prompt based on a second prompt template, and prompting the GenAI model with the expert knowledge distillation prompt. The second prompt template can include instructions for the GenAI model to extract, from the set of relevant bug reports, summaries and validity classifications for the set of relevant bug reports.

At step 350, the method can generate multiple preliminary decisions on validity of the vulnerability report using the GenAI model based on the summary of the vulnerability report and the synopsis for the set of relevant bug reports.

In some examples, to generate multiple preliminary decisions, the method can obtain a plurality of muted prompts previously derived from a meta-prompt using the GenAI model based on a plurality of predefined thinking paradigms. The method can then separately prompt the GenAI model using the plurality of muted prompts. Prompting the GenAI model using a muted prompt can generate one of the multiple preliminary decisions. In some examples, prompting the GenAI model using the meta-prompt can also generate one of the preliminary decisions.

In various examples, the meta-prompt and the plurality of muted prompts include instructions for the GenAI model to (i) classify the vulnerability report as valid or invalid based on analysis of the summary of the vulnerability report and the synopsis for the set of relevant bug reports, and (ii) generate a list of inference bugs which identify one or more relevant bug reports based on which the vulnerability report is classified as valid or invalid.

Then, at step 360, the method can generate a final decision on validity of the vulnerability report based on the multiple preliminary decisions.

In some examples, generating the final decision on validity of the vulnerability report further includes calculating a weighted sum of the multiple preliminary decisions.

In some examples, calculating the weighted sum includes determining weights for the multiple preliminary decisions. In various examples, a weight for a preliminary decision can be determined based on how many relevant bug reports, among the set of relevant bug reports, are found by the GenAI model to support the preliminary decision.

In some examples, the weighted sum is in a range divided into three non-overlapping sub-ranges. The final decision can indicate that (i) the vulnerability report is valid, (ii) the vulnerability report is invalid, or (iii) validity of the vulnerability report is indeterministic, based on the sub-range into which the weighted sum falls.

The method 300 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "send" can also be described as "receive" from a different perspective.

Example Overview of Generative AI and Prompts

Generative AI models, foundation models, and large language models (LLMs) are interconnected concepts in the field of AI. Generative AI, a broad term, encompasses AI systems that generate content such as text, images, music, or code. Unlike discriminative AI models that aim to make decisions or predictions based on input data features, generative AI models focus on creating new data points. Foundation models are a subset of these generative AI models, serving as a starting point for developing more specialized models. LLMs, a specific type of generative AI, work with language and can understand and generate human-like text. In the context of generative AI, including LLMs, a prompt serves as an input or instruction that informs the AI of the desired content, context, or task. This allows users to guide the AI to produce tailored responses, explanations, or creative content based on the provided prompt.

In any of the examples herein, an LLM can take the form of an AI model that is designed to understand and generate human language. Such models typically leverage deep learning techniques such as transformer-based architectures to process language with a very large number (e.g., billions) of parameters. Examples include the Generative Pre-trained Transformer (GPT) developed by OpenAI, Bidirectional Encoder Representations from Transforms (BERT) by Google, A Robustly Optimized BERT Pretraining Approach developed by Facebook AI, Megatron-LM of NVIDIA, or the like. Pretrained models are available from a variety of sources.

In any of the examples herein, prompts can be provided, in runtime, to LLMs to generate responses. Prompts in LLMs can be input instructions that guide model behavior. Prompts can be textual cues, questions, or statements that users provide to elicit desired responses from the LLMs. Prompts can act as primers for the model's generative process. Sources of prompts can include user-generated queries, predefined templates, or system-generated suggestions. Technically, prompts are tokenized and embedded into the model's input sequence, serving as conditioning signals for subsequent text generation. Experiment with prompt variations can be performed to manipulate output, using techniques like prefixing, temperature control, top-K sampling, chain-of-thought, etc. These prompts, sourced from diverse inputs and tailored strategies, enable users to influence LLM-generated content by shaping the underlying context and guiding the neural network's language generation. For example, prompts can include instructions and/or examples to encourage the LLMs to provide results in a desired style and/or format.

Example Architecture of LLM

Figure 4:
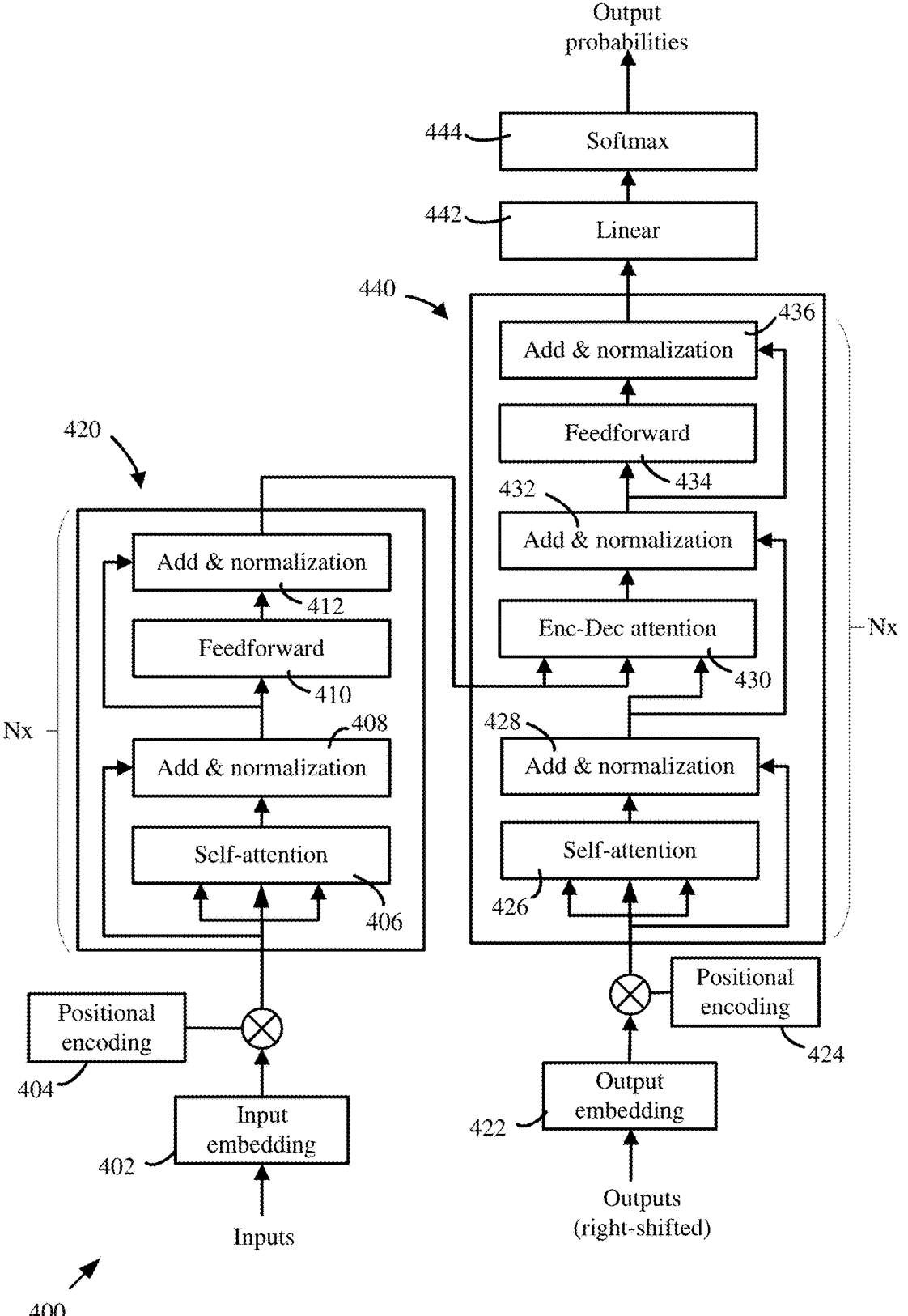
FIG. 4 is an architecture diagram of an example large language model.

FIG. 4 shows an example architecture of an LLM 400, which can be used as the GenAI model (e.g., 180 or 280) described above.

In the depicted example, the LLM 400 uses an autoregressive model (as implemented in OpenAI's GPT) to generate text content by predicting the next word in a sequence given the previous words. The LLM 400 can be trained to maximize the likelihood of each word in the training dataset, given its context.

As shown in FIG. 4, the LLM 400 can have an encoder 420 and a decoder 440, the combination of which can be referred to as a "transformer." The encoder 420 processes input text, transforming it into a context-rich representation. The decoder 440 takes this representation and generates text output. In some examples, the LLM 400 may only include the decoder 440 (and without the encoder 420).

For autoregressive text generation, the LLM 400 generates text in order, and for each word it generates, it relies on the preceding words for context. During training, the target or output sequence, which the model is learning to generate, is presented to the decoder 440. However, the output is right shifted by one position compared to what the decoder 440 has generated so far. In other words, the model sees the context of the previous words and is tasked with predicting the next word. As a result, the LLM 400 can learn to generate text in a left-to-right manner, which is how language is typically constructed.

Text inputs to the encoder 420 can be preprocessed through an input embedding unit 402. Specifically, the input embedding unit 402 can tokenize a text input into a sequence of tokens, each of which represents a word or part of a word. Each token can then be mapped to a fixed-length vector known as an input embedding, which provides a continuous representation that captures the meaning and context of the text input. Likewise, to train the LLM 400, the targets or output sequences presented to the decoder 440 can be preprocessed through an output embedding unit 422. Like the input embedding unit 402, the output embedding unit 422 can provide a continuous representation, or output embedding, for each token in the output sequences.

Generally, the vocabulary in LLM 400 is fixed and is derived from the training data. The vocabulary in LLM 400 consists of tokens generated above during the training process. Words not in the vocabulary cannot be output. These tokens are strung together to form sentences in the text output.

In some examples, positional encodings (e.g., 404 and 424) can be performed to provide sequential order information of tokens generated by the input embedding unit 402 and output embedding unit 422, respectively. Positional encoding is needed because the transformer, unlike recurrent neural networks, process all tokens in parallel and do not inherently capture the order of tokens. Without positional encoding, the model would treat a sentence as a collection of words, losing the context provided by the order of words. Positional encoding can be performed by mapping each position/index in a sequence to a unique vector, which is then added to the corresponding vector of input embedding or output embedding. By adding positional encoding to the input embedding, the model can understand the relative positions of words in a sentence. Similarly, by adding positional encoding to the output encoding, the model can maintain the order of words when generating text output.

Each of the encoder 420 and decoder 440 can include multiple stacked or repeated layers (denoted by Nx in FIG. 4). The number of stacked layers in the encoder 420 and/or decoder 440 can vary depending on the specific LLM architecture. Generally, a higher "N" typically means a deeper model, which can capture more complex patterns and dependencies in the data but may require more computational resources for training and inference. In some examples, the number of stacked layers in the encoder 420 can be the same as the number of stacked layers in the decoder 440. In other examples, the LLM 400 can be configured so that the encoder 420 and decoder 440 can have different numbers of layers. For example, a deeper encoder (more layers) can be used to better capture the input text's complexities while a shallower decoder (fewer layers) can be used if the output generation task is less complex).

The encoder 420 and the decoder 440 are related through shared embeddings and attention mechanisms, which allow the decoder 440 to access the contextual information generated by the encoder 420, enabling the LLM 400 to generate coherent and contextually accurate responses. In other words, the output of the encoder 420 can serve as a foundation upon which the decoder network can build the generated text.

Both the encoder 420 and decoder 440 comprise multiple layers of attention and feedforward neural networks. An attention neural network can implement an "attention" mechanism by calculating the relevance or importance of different words or tokens within an input sequence to a given word or token in an output sequence, enabling the model to focus on contextually relevant information while generating text. In other words, the attention neural network plays "attention" on certain parts of a sentence that are most relevant to the task of generating text output. A feedforward neural network can process and transform the information captured by the attention mechanism, applying non-linear transformations to the contextual embeddings of tokens, enabling the model to learn complex relationships in the data and generate more contextually accurate and expressive text.

In the example depicted in FIG. 4, the encoder 420 includes an intra-attention or self-attention neural network 406 and a feedforward neural network 410, and the decoder 440 includes a self-attention neural network 426 and a feedforward neural network 434. The self-attention neural networks 406, 426 allow the LLM 400 to weigh the importance of different words or tokens within the same input sequence (self-attention in the encoder 420) and between the input and output sequences (self-attention in the decoder 440), respectively.

In addition, the decoder 440 also includes an inter-attention or encoder-decoder attention neural network 430, which receives input from the output of the encoder 420. The encoder-decoder attention neural network 430 allows the decoder 440 to focus on relevant parts of the input sequence (output of the encoder 420) while generating the output sequence. As described below, the output of the encoder 420 is a continuous representation or embedding of the input sequence. By feeding the output of the encoder 420 to the encoder-decoder attention neural network 430, the contextual information and relationships captured in the input sequence (by the encoder 420) can be carried to the decoder 440. Such connection enables the decoder 440 to access to the entire input sequence, rather than just the last hidden state. Because the decoder 440 can attend to all words in the input sequence, the input information can be aligned with the generation of output to improve contextual accuracy of the generated text output.

In some examples, one or more of the attention neural networks (e.g., 406, 426, 430) can be configured to implement a single head attention mechanism, by which the model can capture relationships between words in an input sequence by assigning attention weights to each word based on its relevance to a target word. The term "single head" indicates that there is only one set of attention weights or one mechanism for capturing relationships between words in the input sequence. In some examples, one or more of the attention neural networks (e.g., 406, 426, 430) can be configured to implement a multi-head attention mechanism, by which multiple sets of attention weights, or "heads," in parallel to capture different aspects of the input sequence. Each head learns distinct relationships and dependencies within the input sequence. These multiple attention heads can enhance the model's ability to attend to various features and patterns, enabling it to understand complex, multi-faceted contexts, thereby leading to more accurate and contextually relevant text generation. The outputs from multiple heads can be concatenated or linearly combined to produce a final attention output.

As depicted in FIG. 4, both the encoder 420 and the decoder 440 can include one or more addition and normalization layers (e.g., the layers 408 and 412 in the encoder 420, the layers 428, 432, and 436 in the decoder 440). The addition layer, also known as a residual connection, can add the output of another layer (e.g., an attention neural network or a feedforward network) to its input. After the addition operation, a normalization operation can be performed by a corresponding normalization layer, which normalizes the features (e.g., making the features to have zero mean and unit variance), This can help in stabilizing the learning process and reducing training time.

A linear layer 442 at the output end of the decoder 440 can transform the output embeddings into the original input space. Specifically, the output embeddings produced by the decoder 440 are forwarded to the linear layer 442, which can transform the high-dimensional output embeddings into a space where each dimension corresponds to a word in the vocabulary of the LLM 400.

The output of the linear layer 442 can be fed to a softmax layer 444, which is configured to implement a softmax function, also known as softargmax or normalized exponential function, which is a generalization of the logistic function that compresses values into a given range. Specifically, the softmax layer 444 takes the output from the linear layer 442 (also known as logits) and transforms them into probabilities. These probabilities sum up to 1, and each probability corresponds to the likelihood of a particular word being the next word in the sequence. Typically, the word with the highest probability can be selected as the next word in the generated text output.

Still referring to FIG. 4, the general operation process for the LLM 400 to generate a reply or text output in response to a received prompt input is described below.

First, the input text is tokenized, e.g., by the input embedding unit 402, into a sequence of tokens, each representing a word or part of a word. Each token is then mapped to a fixed-length vector or input embedding. Then, positional encoding 404 is added to the input embeddings to retain information regarding the order of words in the input text.

Next, the input embeddings are processed by the self-attention neural network 406 of the encoder 420 to generate a set of hidden states. As described above, multi-head attention mechanism can be used to focus on different parts of the input sequence. The output from the self-attention neural network 406 is added to its input (residual connection) and then normalized at the addition and normalization layer 408.

Then, the feedforward neural network 410 is applied to each token independently. The feedforward neural network 410 includes fully connected layers with non-linear activation functions, allowing the model to capture complex interactions between tokens. The output from the feedforward neural network 410 is added its input (residual connection) and then normalized at the addition and normalization layer 412.

The decoder 440 uses the hidden states from the encoder 420 and its own previous output sequence to generate the next token in an autoregressive manner so that the sequential output is generated by attending to the previously generated tokens. Specifically, the output of the encoder 420 (input embeddings processed by the encoder 420) are fed to the encoder-decoder attention neural network 430 of the decoder 440, which allows the decoder 440 to attend to all words in the input sequence. As described above, the encoder-decoder attention neural network 430 can implement a multi-head attention mechanism, e.g., computing a weighted sum of all the encoded input vectors, with the most relevant vectors being attributed the highest weights.

The previous output sequence of the decoder 440 is first tokenized by the output embedding unit 422 to generate an output embedding for each token in the output sequence. Similarly, positional embedding 424 is added to the output embedding to retain information regarding the order of words in the output sequence.

The output embeddings are processed by the self-attention neural network 426 of the decoder 440 to generate a set of hidden states. The self-attention mechanism allows each token in the text output to attend to all tokens in the input sequence as well as all previous tokens in the output sequence. The output from the self-attention neural network 426 is added to its input (residual connection) and then normalized at the addition and normalization layer 428.

The encoder-decoder attention neural network 430 receives the output embeddings processed through the self-attention neural network 426 and the addition and normalization layer 428. Additionally, the encoder-decoder attention neural network 430 also receives the output from the addition and normalization layer 412 which represents input embeddings processed by the encoder 420. By considering both processed input embeddings and output embeddings, the output of the encoder-decoder attention neural network 430 represents an output embedding which takes into account both the input sequence and the previously generated outputs. As a result, the decoder 440 can generate the output sequence that is contextually aligned with the input sequence.

The output from the encoder-decoder attention neural network 430 is added to part of its input (residual connection), i.e., the output from the addition and normalization layer 428, and then normalized at the addition and normalization layer 432. The normalized output from the addition and normalization layer 432 is then passed through the feedforward neural network 434. The output of the feedforward neural network 434 is then added to its input (residual connection) and then normalized at the addition and normalization layer 436.

The processed output embeddings output by the decoder 440 are passed through the linear layer 442, which maps the high-dimensional output embeddings back to the size of the vocabulary, that is, it transforms the output embeddings into a space where each dimension corresponds to a word in the vocabulary. The softmax layer 444 then converts output of the linear layer 442 into probabilities, each of which corresponds to the likelihood of a particular word being the next word in the sequence. Finally, the LLM 400 samples an output token from the probability distribution generated by the softmax layer 444 (e.g., selecting the token with the The steps described above are repeated for each new token until an end-of-sequence token is generated or a maximum length is reached. Additionally, if the encoder 420 and/or decoder 440 have multiple stacked layers, the steps performed by the encoder 420 and decoder 440 are repeated across each layer in the encoder 420 and the decoder 440 for generation of each new token.

Example Vulnerability Knowledge Distillation

Generally, a vulnerability report generated by a tool (e.g., BDBA or the like) contains important information that can be helpful for determining whether the reported vulnerability is valid or invalid. This information may include the affected software and version, potential impact (e.g., code execution), and the methods (of identified vulnerable libraries) by which the vulnerability can be triggered or exploited. Due to the complex and structured nature of the vulnerable report, direct extraction of this information can be challenging. As described herein, a vulnerability knowledge distiller (e.g., 130) can automatically distill a vulnerability summary using a GenAI model.

As an example, an AI agent (e.g., 250) can instruct a prompt generator (e.g., 240) to generate a vulnerability knowledge distillation prompt based the following prompt template:

```
SYSTEM = """ You are an expert in software vulnerability analyzing , and work at SAP
HANA Core development . """
TEMPLATE = """ Your task is to generate a concise yet comprehensive summary of the
CVE (Common Vulnerabilities and Exposures ) described in the provided NVD ( National
Vulnerability Database ) and BDSA ( Black Duck Security Advisory ) information .
First , extract the key details from the provided information :
<NVD_DESCRIPTION >
{{ NVD_DESCRIPTION } }
</ NVD_DESCRIPTION >
<BDSA_DESCRIPTION >
{ { BDSA_DESCRIPTION } }
</ BDSA_DESCRIPTION >
<BDSA_TECH_DETAILS >
{{ BDSA_TECH_DETAILS } }
</ BDSA_TECH_DETAILS >
<BDSA_SOLUTION >
{{ BDSA_SOLUTION } }
</ BDSA_SOLUTION >
<BDSA_VERSION_RANGE >
{{ BDSA_VERSION_RANGE } }
</ BDSA_VERSION_RANGE >
Then , write a summary of the vulnerability that covers :
- The CVE ID { { NVD_ID }} and BDSA ID { { BDSA_ID } }
- The affected software and versions
- The potential impact (e.g. denial of service , code execution )
- How the vulnerability can be triggered or exploited
- Mitigations and fixes
Aim to keep the summary under 500 words while still covering the key points . Use the
BDSA title { { BDSA_TITLE } } as a guide for the appropriate level of technical detail .
Note that , if the <NVD_DESCRIPTION ></NVD_DESCRIPTION > is None , ignore it.
You need to response as the following format :
[ CVE ID ]:
[ BDSA ID ]:
[ Affected Software and Versions ]:
[ Description ]:
[ Potential Impact ]:
[ Triggering the Vulnerability ]:
[ Mitigation and Fixes ]:
[ Additional Notes ]:
[ Summary ]:
"""
``` highest probability), and this token is added to the sequence of generated tokens for the text output.

This example prompt template serves as a structured guide for the GenAI model to generate a vulnerability summary. It includes placeholders within curly brackets (e.g., {{NVD_DESCRIPTION}}, {{BDSA_SOLUTION}}, {{NVD_ID}}, etc.) to dynamically insert details extracted from vulnerability report. These placeholders allow the GenAI model to tailor the content based on specific data fields, such as descriptions, technical details, solutions, version ranges, and identifiers (e.g., CVE and BDSA IDs). The template also specifies the desired output format and key elements, ensuring concise and comprehensive summaries of affected software, potential impacts, triggering mechanisms, and mitigation strategies.

The generated vulnerability knowledge distillation prompt can populate these placeholders with respective fields information extracted from the vulnerability report (e.g., by the parser 255). For example, the parser can generate the following object including pertinent fields extracted from the vulnerability report:

```
{
  "NVD_id": "CVE-0000-11111",
  "NVD_description": "The Apache Xerces C++ XML parser on versions 3.0.0 before
3.2.5 contains a use-after-free error triggered during the scanning of external
DTDs.\n\nUsers are recommended to upgrade to version 3.2.5 which fixes the issue, or
mitigate the issue by disabling DTD processing. This can be accomplished via the DOM
using a standard parser feature, or via SAX using the XERCES_DISABLE_DTD
environment variable.\n\nThis issue has been disclosed before as CVE-2018-1311, but
unfortunately that advisory incorrectly stated the issue would be fixed in version 3.2.3 or
3.2.4.\n\n",
  "BDSA_id": "BDSA-1111-2222",
  "BDSA_description": "Xerces-C++ is vulnerable to a use-after-free flaw when parsing
an XML document via the SAX API. In an application that uses Xerces-C++ to parse user
supplied XML documents a remote attacker could leverage this to cause a denial-of-service
(DoS) of the application, or potentially if they can perform heap grooming, arbitrary code
execution.\n\nNote: The Vendor states\n> This issue has been disclosed before as **CVE-
1234-1111** , but unfortunately that advisory incorrectly stated the issue would be fixed in
version 3.2.3 or 3.2.4.",
  "BDSA_title": "Apache Xerces-C++ Vulnerable to Memory Corruption via Use-After-
Free on External DTD Scan",
  "BDSA_tech_des": "A use-after-free can occur because a 'Janitor' templated class is
used to wrap the allocated 'DTDEntityDecl'. 'Janitor' instances automatically free the
objects they wrap during destruction. This will free the 'DTDEntityDecl' instance on the
stack when the 'Janitor' instance goes out of scope. This free'd 'DTDEntityDecl' instance
can be referenced later as the 'curEntity' variable in 'ReaderMgr::getLastExtEntity',
triggering the use-after-free. At the very least this can trigger a crash, but if heap grooming
can be accomplished between these two steps, arbitrary code execution may be possible.",
  "BDSA_solution": "Fixed in [v3.2.5](https://github.com/apache/xerces-
c/releases/tag/v3.2.5) by [this](https://github.com/apache/xerces-
c/commit/e0024267504188e42ace4dd9031d936767676767681) commit.\n\nThe latest
releases can be found [here](https://github.com/apache/xerces-c/tags).",
  "BDSA_ver_range": [
    {
      "versionStart": "2.2.0",
      "versionEnd": "3.2.4"
    }
  ]
}
```

After prompting the GenAI model with the vulnerability knowledge distillation prompt incorporating the above fields information, the GenAI model can generate a structured and concise vulnerability summary, such as the following:

"[CVE ID]: CVE-0000-11111
[BDSA ID]: BDSA-1111-2222
[Affected Software and Versions]: Apache Xerces-C++ XML parser versions 3.0.0 to 3.2.4
[Description]: Apache Xerces-C++ is vulnerable to a use-after-free flaw when parsing XML documents via the SAX API. This vulnerability occurs during the scanning of external DTDs due to improper handling of the 'DTDEntityDecl' instance by the 'Janitor' templated class, which automatically frees the objects it wraps upon destruction. This can lead to the freed 'DTDEntityDecl' instance being reference'd later, causing a use-after-free error.
[Potential Impact]: The vulnerability can lead to a denial-of-service (DOS) condition in applications using Xerces-C++ to parse user-supplied XML documents. Additionally, if an attacker can perform heap grooming, it may be possible to achieve arbitrary code execution.
[Triggering the Vulnerability]: The vulnerability can be triggered by parsing an XML document that includes external DTDs. The use-after-free error occurs when the 'Janitor' class frees the 'DTDEntityDecl' instance, which is later referenced as the 'curEntity' variable in the 'ReaderMgr: :getLastExtEntity' function.
[Mitigations and Fixes]: Users are recommended to upgrade to version 3.2.5 of Apache Xerces-C++, which contains the fix for this issue. The fix is implemented in the commit -continued

[e0024267504188e42ace4dd9031d936767676767681](https://github.com/apache/xerces-c/commit/e0024267504188e42ace4dd9031d936767676767681). Alternatively, users can mitigate the issue by disabling DTD processing. This can be done via the DOM using a standard parser feature or via SAX using the 'XERCES_DISABLE_DTD' environment variable.
[Additional Notes]: This issue was previously disclosed as CVE-1234-1111, but the advisory incorrectly stated that the issue would be fixed in versions 3.2.3 or 3.2.4. The correct fix is available in version 3.2.5.
[Summary]: Apache Xerces-C++ versions 3.0.0 to 3.2.4 are affected by a use-after-free vulnerability when parsing XML documents with external DTDs. This flaw can lead to denial-of-service or potentially arbitrary code execution if heap grooming is performed. The issue arises from the improper handling of the 'DTDEntityDecl' instance by the 'Janitor' class. Users should upgrade to version 3.2.5 or disable DTD processing to mitigate the risk."

The generated vulnerability summary can be further incorporated in subsequent decision prompts to generate preliminary decisions, as described above.

Example Overview of Expert Knowledge Distillation

Figure 5:
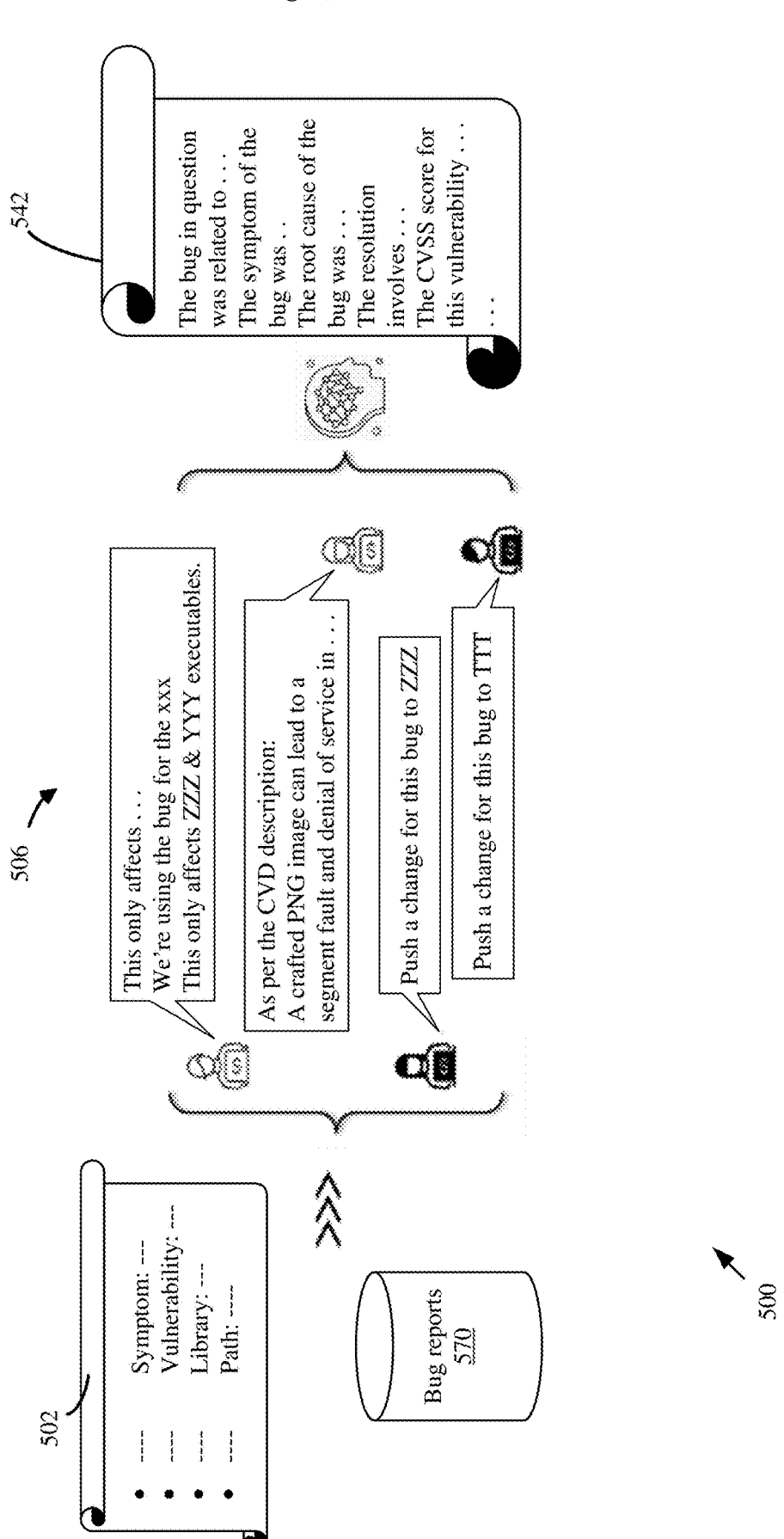
FIG. 5 is a schematic diagram depicting an overall process of distilling expert knowledge relevant to a vulnerability library.

FIG. 5 schematically depicts an overall process 500 of distilling expert knowledge relevant to a vulnerability library.

key insights such as symptoms, resolutions, reproduction steps, and relevant discussions or comments. The generated tickets summary 542 can be further incorporated in subsequent decision prompts to generate preliminary decisions, as described above.

For example, an AI agent (e.g., 250) can instruct a prompt generator (e.g., 240) to generate an expert knowledge distillation prompt based the following prompt template, which includes a placeholder {bug_info} which can be populated with specific details of the relevant bug reports:

"You are a Quality Assurance Engineer working at SAP HANA Core development. Your job is to look at bugs that are already resolved and to document how these issues were identified. This includes detailed information of how a developer can identify similar issues. The goal of your documentation is that we can use your documentation to identify similar bugs by comparing their documentation with yours. You should write a continuous text, not a list of points. Your documentation should not mention how developers should act, it should just include the facts and be completely objective.
You got a new bug to analyze, you can find the details below: {bug_info}
Write about how this issue was identified.
Rules:
* Include the name of the test case that identified the issue, if available
* Do not include the host, the profile or other details about where and when the test was executed
* Do not write about the information that you did not include in the documentation
* Include file names where an issue was identified if available
* Do not include time stamps of any kind to your documentation
* Do not include the short description in your documentation
* Do not include any words just for the sake of providing a nicely structured text. Focus on the facts.
* Do not tell developers how to identify or prevent similar issues. They will know how to do it, if you just include all relevant facts
* If something does not provide significant information to improve the documentation, leave it out and do not mention it
Never include line numbers in your text. Detailed information of how the bug was identified."

As shown, a bug reports database 570 can include a cohort of bug reports 502 or tickets previously collected from historical vulnerability reports. Each bug report 502 can identify a vulnerability library used by a historical software and a path of the vulnerability library within the historical software. The bug report 502 may also include other vulnerability information, such as symptom, resolution, how to reproduce the bug, etc. In various examples, the bug report may also include discussion threads 506 or comments entered by the support team when the team members analyzed the vulnerability report.

An expert knowledge distiller (e.g., 140) can automatically identify a set of relevant bug reports from the bug reports database 170, as described further below. Once the relevant bug reports are identified, the expert knowledge distiller can use the GenAI model to extract a tickets summary 542 or synopsis of these bug reports, consolidating The process 500 enables the system to ground its analysis (and decision making) in relevant context and incorporate domain-specific knowledge (e.g., expert knowledge contributed by the support team), improving the reliability of vulnerability assessments.

Example Retrieval of Relevant Bug Reports

As described above, a received vulnerability report generated for a selected software can specify a vulnerable library used by the selected software and a path of the vulnerable library within the selected software. FIG. 6 illustrates an example process 600 for retrieving a set of relevant bug reports (i.e., bug reports that are relevant to, or contextually similar to, the received vulnerability report) from a bug reports database 670.

The bug reports database 670 contains a cohort of bug reports 675 or tickets previously generated from some historical software. Each bug report 675 can specify, e.g., in a short description section (or a different field), a vulnerable library (e.g., including the name and version of the library) and a path of the vulnerable library utilized by the historical software.

In the depicted example, the received vulnerability report specifies a vulnerable library with a unique vulnerability identifier (e.g., "Vulnerability ID" is "CVD-1111-2222"), the name and version of the vulnerable library (e.g., "Detected library" is "xyz1.1.1"), and a full path of the vulnerable library within the selected software (e.g., "Detected path" is "AAA/BBB/CCC/xyz1.1.1"). Such vulnerability library information 610 can be extracted by parsing the vulnerability report (e.g., by the parser 255).

To identify bug reports that are relevant to the received vulnerability report, the vulnerability library information 610 extracted from the vulnerability report can be compared with the vulnerability library information contained in the bug reports 675 to find contextual matches, e.g., based on the library name and path.

As shown in FIG. 6, the process 600 can start with a preprocessing step 620 which removes version information from the detected vulnerable library and its associated path. For example, after preprocessing, the detected library path "AAA/BBB/CCC/xyz1.1.1" becomes "AAA/BBB/CCC/xyz", and the detected library "xyz1.1.1" becomes "xyz". The version-less path and library 630 can serve as the basis for searching relevant bug reports.

Using the preprocessed path and library 630, a query 640 can be executed to identify bug reports 675 whose short descriptions (or a different field) contain both the detected path (e.g., "AAA/BBB/CCC/xyz") and the detected library (e.g., "xyz"). In some examples, this query can be performed using a string-matching operation (e.g., SQL LIKE) on the bug reports 675 stored in the bug reports database 670.

A bug report matching the full detected path and library is deemed as a relevant bug report, and the bug report's identifier can be added to a results list 650 which represent a set of relevant bug reports.

The results list 650 can be initialized as an empty set, and the count of relevant bug reports in the set can begin at zero. As relevant bug reports are identified and added to the results list 650, the count is incremented accordingly, provided that the count of relevant bug reports in the set remains smaller than a predefined number (e.g., a threshold K), as indicated by the condition check 660. If the count reaches this predefined number, the process can stop searching and output the final list as the set of relevant bug reports 690.

On the other hand, if it is determined that the count of bug reports in the results list 650 is smaller than the predefined number after evaluating all bug reports in the database 670, the process can continue by iteratively comparing sub-paths of the vulnerable library's detected path with the paths stored in the bug reports. In some examples, this iterative approach involves removing a prefix (ending at a path separator, e.g., '/') from the detected path 680 and performing a new search at each iteration. For example, if the initial detected path is "AAA/BBB/CCC/xyz", the first sub-path would be "BBB/CCC/xyz", followed by "CCC/xyz", and so on. During each iteration, the query can be repeated to search for bug reports whose paths match the current sub-path. For instance, if a bug report in the database references "BBB/CCC/xyz" as the library path, it can be added to the results list 650 during the second iteration. This iterative sub-path matching can continue until the results list 650 reaches the predefined number (e.g., K) or the maximum number of iterations is reached, as determined by the number of segments (e.g., number of path separators) in the original detected path. This iterative process ensures that even when exact full path matches are scarce, partial path matches can be considered.

The final set of relevant bug reports 690 can be ordered according to certain criteria. For example, bug reports matching the full detected path can have a higher priority and are ranked above those matching shorter sub-paths. Within the same iteration, where bug reports are identified based on the same full path or sub-path, the bug reports can be further ordered by their creation time in descending order. This approach ensures that the most precise matches are prioritized while also favoring the most recent and potentially more relevant bug reports when multiple matches exist.

Example Thinking Paradigms

Existing GenAI models may experience hallucinations during decision-making processes. To mitigate such risks and enhance overall performance, auto-prompt engineering techniques can be applied to dynamically refine a meta-prompt into multiple muted prompts which embody diverse thinking paradigms. Each thinking paradigm includes specific instructions for a GenAI model on how to modify the meta-prompt. Some exemplary and non-exhaustive thinking paradigms are listed below:

| Index | Thinking paradigms |
| --- | --- |
| 1 | How can I simplify the problem so that it is easier to solve? |
| 2 | What are the key assumptions underlying this problem? |
| 3 | What are the alternative perspectives or viewpoints on this problem? |
| 4 | Critical Thinking: This style involves analyzing the problem from different perspectives, questioning assumptions, and evaluating the evidence or information available. It focuses on logical reasoning, evidence-based decision-making, and identifying potential biases or flaws in thinking. |
| 5 | Try creative thinking, generate innovative and out-of-the-box ideas to solve the problem. Explore unconventional solutions, thinking beyond traditional boundaries, and encouraging imagination and originality. |
| 6 | Use systems thinking: Consider the problem as part of a larger system and understanding the interconnections of various elements. Focuses on identifying the underlying causes, feedback loops, and inter-dependencies that influence the problem, and developing holistic solutions that address the system as a whole. |

| Index | Thinking paradigms |
|---|---|
| 7 | Use Risk Analysis: Evaluate potential risks, uncertainties, and trade-offs associated with different solutions or approaches to a problem. Emphasize assessing the potential consequences and likelihood of success or failure, and making informed decisions based on a balanced analysis of risks and benefits. |
| 8 | Use Reflective Thinking: Step back from the problem, take the time for introspection and self-reflection. Examine personal biases, assumptions, and mental models that may influence problem-solving, and being open to learning from past experiences to improve future approaches. |
| 9 | Let's think step-by-step. |
| 10 | Let's make a step-by-step plan and implement it with good notion and |
| 11 | explanation. |
| 12 | Use step-back thinking: abstract the questions and answer the question. |
| 13 | How can I break down this problem into smaller, more manageable parts? |
| 14 | Ignoring the current best solution, create an entirely new solution to the problem. Let's imagine the current best solution is totally wrong, what other ways are there to think about the problem specification? |

Example Meta-Prompt

The following is an example meta-prompt, based on which multiple muted prompts can be generated:

META_SYSTEM = """ Consider, you are expert in software vulnerability detection and your task is detecting the given CVE -ID is valid or invalid vulnerability for SAP HANA.
"""
META_TEMPLATE = """ Analyses the given CVE-ID is valid or invalid vulnerability based on some provided bug reports about the similar vulnerability information in SAP HANA. Before making a final decision, you need to think step-by-step.
Step 1: Analyze the provided bug reports and their CVE samples. Pay close attention to the detected path or file for each bug.
Step 2: Compare the path / file information from the bug reports to the detected library and path provided for the CVE -ID in question. Look for any close matches.
Step 3: For each relevant bug report , determine if the vulnerability was deemed valid (True).
or invalid ( False ). Try to understand the reasoning provided.
Step 4: Based on the analysis of the bug reports and the CVE-ID details, make a determination on if the CVE -ID likely represents a valid or invalid vulnerability in SAP HANA.
Step 5: Remember , if an exact match is found in the bug reports , the CVE -ID should be considered valid / invalid in the same way as the matching bug report. Without an exact match, the confidence of the decision may be lower.
<Notice >
If the provided bug information is None or not related with the given CVE -ID , you can still make a decision, but the Confidence within the <Output format > should be 1.
In the provided bug reports, each sample contains Bug ID and Bug summary. For example:
{
Bug ID: 123456
Vulnerability : Valid
Bug summary : The bug in question was related to Protecode security issues detected in the file "xxx/yyy/zyx/uuu/i.i. v00001111-2222.xyz ". The specific security vulnerability identified was "CVE-1111-0000" with a CVSS score of x.y.
}
In the Bug summary, there is the key information about its CVE sample 's detected path and library, and some comments about the CVE sample has impact for SAP HANA or not. This provide an important information about the CVE sample is valid or invalid vulnerability.
You can use this information to understand the reason the Bug ID 's CVE sample is True or False .
</ Notice >
<Task >
Given the CVE -ID 's description above, analyses all relevant description and determine the given CVE -ID is valid or invalid vulnerability.
</Task >
<Output format >
The output should be Json format. the example output:
{
" Decision ": valid or invalid vulnerability.
" Reason ": Short the reason of True or False vulnerability, should be in 100 words.
" Type ": the type of you give the decision, for example, path does not exist. It should be in 5 words.

-continued

```
" Inference Bug ": the relevant bug ids in the provided <Relevant Bug Report > which
help to make the decision.
}
</ Output format >
<Relevant Bug Report >
{{ bugs_info }}
</ Relevant Bug Report >
<CVE -ID >
The detected vulnerability library in SAP HANA : {{ detected_lib }}
The detected vulnerability path in SAP HANA : {{ detected_path }}
The input CVE-ID 's detailed information:
{{ cve_info }}
</CVE -ID >
"""
```

The above meta-prompt has four placeholders, {bugs_info}, {detected_lib}, {detected_path}, and {cve_info}. The {detected_lib} and {detected_path} placeholders can be respectively populated with the name and path of the vulnerability library identified in the vulnerability report (e.g., the "detected library" and "detected path" in the vulnerability library information 610 of FIG. 6). The {cve_info} placeholder can be populated with the vulnerability summary (e.g., 132 or 232) distilled from the vulnerability report (e.g., the exemplary vulnerability summary for [CVE ID]:

CVE-0000-11111 listed above). The {bugs_info} placeholder can be populated with the tickets summary (e.g., 142 or 242) distilled from relevant bug reports, as described above. For each relevant bug report, the tickets summary can include the following information: (1) the unique identifier of the bug report, (2) the validity status (e.g., "valid" or "invalid") of the bug report (e.g., as determined by the support team), and (3) a summary of the bug report. The following lists an example tickets summary distilled from three relevant bug reports:

```
Bug ID: 123456
Vulnerability: invalid
Bug summary: The bug in question was related to Protecode security issues for xerces-
c++x.y.z (CVE-2012-0880) that were detected in the a_b.tar/c/d.so file. The bug had a very
high priority and was marked as resolved with an invalid resolution status. The bug was
reported in the IM Platform component.\n\nThe symptom of the bug was the detection of
CVE-2012-0880 in the Protecode tool. However, the steps to reproduce the bug were not
provided, and there was no workaround mentioned.\n\n The root cause of the bug was
identified as a security vulnerability found in the open-source library, xerces-c++x.y.z.
This vulnerability was reported by the Protecode daily scan, which flagged the library as
vulnerable with a CVSS score of 7.5.\n\nTo address this bug, a solution was implemented,
but the details of the solution were not provided. It can be assumed that the fix involved
addressing the security vulnerability in the xerces-c++x.y.z library.\n\nIt is worth noting
that the comments section mentioned that the fix must be included in HANA Revision
<HANA Cloud xxxx.y (QRCa)> until 2023-10-04. This indicates that the fix was planned
to be included in a specific release of the HANA Cloud product.\n\nIn summary, the bug
related to Protecode security issues for xerces-c++x.y.z (CVE-2012-0880) was resolved by
addressing the security vulnerability in the xerces-c++x.y.z library. The specific details of
the fix were not provided, but it was planned to be included in a future release of the
HANA Cloud product.
Bug ID: 123457
Vulnerability: invalid
Bug summary: The bug in question was related to Protecode security issues for xerces-
c++x.y.z (CVE-2023-37536) that were detected in the a_b.tar/c/d.so file. The bug was
given a \"Showstopper\" priority and was marked as \"RESOLVED\" with a resolution
status of \"INVALID\". The bug was found in the IM Platform component.\n\nThe
symptom of the bug was the detection of the CVE-2023-37536 vulnerability by the
Protecode tool. However, no steps to reproduce or any workaround were provided.\n\nThe
root cause of the bug was identified as a security vulnerability found in the open-source
library, xerces-c++x.y.z. The Protecode daily scan reported this library as vulnerable with a
CVSS score of 8.8.\n\nTo resolve the bug, the SAP Security team analyzed the issue and
determined that the vulnerability lies in the HTTP access exposed by the xerces
functionality in the SDQ/IM Platform. However, it was noted that the SDQ/IM Platform
does not use HTTP access and only utilizes the xerces functionality for XML
parsing.\n\nBased on this analysis, it was concluded that the reported vulnerability does not
pose a risk to the SDQ/IM Platform. Therefore, the resolution status of the bug was marked
as \"INVALID\".\n\nIn terms of the solution, no specific details were provided in the bug
report. However, it can be inferred that the bug was resolved by confirming that the
reported vulnerability does not affect the SDQ/IM Platform due to the absence of HTTP
access.\n\nIn summary, the bug related to Protecode security issues for xerces-c++x.y.z
(CVE-2023-37536) was resolved by determining that the reported vulnerability does not
pose a risk to the SDQ/IM Platform. The bug was marked as \"INVALID\" based on this
analysis.
Bug ID: 123458
Vulnerability: invalid
```

-continued

```
Bug summary: Este informe de error describe un problema de seguridad relacionado
con la detecci\u00f3n de Protecode de CVE-2018-1311 en la biblioteca xerces-c++. El
error ha sido resuelto con un estado de resoluci\u00f3n INVALID, lo que indica que no era
un problema v\u00e9llido.\n\nLa causa ra\u00edz del error fue identificada como una
vulnerabilidad de seguridad en la biblioteca de c\u00f3digo abierto. Sin embargo, los pasos
espec\u00edficos para reproducir el problema y cualquier soluci\u00f3n alternativa posible
no se proporcionaron en el informe de error.\n\nPara abordar el error, es probable que el
equipo de desarrollo revisara el CVE-2018-1311 informado y sus detalles asociados. El
informe de error menciona que el CVE tiene una puntuaci\u00f3n de 8.1 y proporciona un
enlace a sus detalles en el sitio web de NIST. Sin embargo, las acciones espec \u00edficas
tomadas para resolver el error no se mencionan en el informe.\n\nSe menciona que la
soluci\u00f3n para este error debe incluirse en la Revisi\u00f3n HANA <HANA 2.0 SPSOa
- Rev 2.00.0bc.00> hasta el 18-01-2022. Esto sugiere que la soluci\u00f3n estaba planeada
para ser incluida en una futura versi\u00f3n o parche del software SAP
HANA.\n\nDesafortunadamente, sin m\u00e1s informaci\u00f3n sobre los pasos para
reproducir el problema y las acciones espec\u00edficas tomadas para resolverlo, no es
posible proporcionar una documentaci\u00f3n detallada sobre c\u00f3mo se solucion\u00f3
el error. Sin embargo, es importante destacar que es probable que el equipo de desarrollo
analizara la vulnerabilidad de seguridad informada, revisara el CVE asociado y planeara
incluir una soluci\u00f3n en una futura versi\u00f3n del software HANA.
```

Example Prompt Template for Generating Muted Prompts

An example prompt template which can be used to generate muted prompts ("refined_prompts") using different thinking paradigms is listed below, in which the {PROMPT} placeholder receives the meta-prompt, and the {THINKING_STYLE} placeholder receives a corresponding thinking paradigm:

```
SYSTEM = """ You are expert in prompt engineering . """
REFINE_TEMPLATE = """ Your task is to refine the prompt using a specific thinking
style .
Here is the original prompt :
<Prompt >
{{ PROMPT }}
</ Prompt >
When refining this prompt , adopt the following thinking style :
<Thinking style >
{{ THINKING_STYLE }}
</ Thinking style >
To refine the prompt using this thinking style:
1. Carefully analyze the original prompt to understand its key elements and objectives.
2. Consider how the specified thinking style would approach the topic of the prompt. What
aspects would it focus on? What tone and perspective would it take?
3. Brainstorm ways to modify the language, framing, and scope of the prompt to better
align with the thinking style. Aim to preserve the core intent of the original prompt .
4. Rewrite the prompt infusing the key characteristics, priorities and viewpoint of the
thinking style throughout. The refined prompt should feel like it was conceived by
someone with that style of thought.
5. Review the rewritten prompt to ensure it maintains the essence of the original while
distinctly embodying the target thinking style. Make any final tweaks needed.
After completing this process, output the refined writing prompt inside <refined_prompt >
tags . """
```

Different thinking paradigms can be systematically applied to create a well-rounded set of muted prompts, each instructing the GenAI model to approach the problem from a unique perspective, effectively regularizing the GenAI model's behavior and reducing its susceptibility to errors or biased reasoning. For example, a muted prompt created based on the critical analysis thinking paradigm may encourage the GenAI model to examine potential flaws in reasoning, while a muted prompt created based on sequential reasoning thinking paradigm instructs the GenAI model to ensure step-by-step logical consistency in its conclusions. As another example, a muted prompt created based on reflective thinking paradigm enables the GenAI model to re-evaluate its outputs in light of new evidence or alternative interpretations. These diverse prompts not only enhance the quality of the generated responses but also help uncover vulnerabilities that may otherwise be overlooked when relying on a single prompt.

Example Muted Prompts

In some examples, among many muted prompts, a set of muted prompts that are deemed to yield high performance can be selected for subsequent usage by an adjudicator (e.g., 160 or 260) to generate multiple preliminary decisions. This set of muted prompts can be selected, e.g., during a training session by evaluating the muted prompts using a training dataset comprising a plurality of test vulnerability reports (samples) with known "valid" or "invalid" classifications. Each muted prompt can be sent to the GenAI model to generate a decision on the validity of each test vulnerability report, and these decisions can be compared with the known classifications to measure the GenAI model's classification accuracy. Performance metrics (e.g., accuracy, precision, recall, F1-score, etc.) can be used to assess the effectiveness of each muted prompt, ensuring that the selected set yields reliable and accurate results.

As examples, four muted prompts (corresponding to four different thinking paradigms) that were found to yield good performance in a training dataset are listed below (each includes the same placeholders as the meta-prompt:

{bugs_info}, {detected_lib}, {detected_path}, and {cve_info}). The following is a first example muted prompt corresponding to the nineth thinking paradigm listed above (Let's think step-by-step):

```
REFACT_SYSTEM_1 = """ You are working in SAP and have strong experience in
security analysis.
Your task is to determine if a given CVE vulnerability is valid or invalid based on
information from related CVEs and their associated Bugzilla tickets . """
REFACT_TEMPLATE_1 = """ Here are the details on the CVE in question :
<CVE >
The input CVE -ID 's description:
{{ cve_info }}
The detected vulnerability library in our production : {{ detected_lib }}
The detected vulnerability path in our production : {{ detected_path }}
</CVE >
And here is the information on related CVEs and their Bugzilla tickets:
< RELATED_CVES_AND_TICKETS >
{{ bugs_info }}
</ RELATED_CVES_AND_TICKETS >
To make the validity determination , follow these steps:
1. Carefully review the details of the CVE in question , paying attention to the detected
path and libraries involved.
2. For each of the related CVEs provided:
a. Check if the related CVE has a similar detected path or involves the same libraries as
the CVE in question.
b. If there are similarities, read through the developer comments on the associated
Bugzilla ticket.
c. In the ticket comments, look for any statements from developers indicating if they
consider the related CVE to be valid or invalid. Pay attention to any reasoning they
provide.
d. Analyze whether the validity reasoning the developers gave for the related CVE would
also apply to the CVE in question.
3. After reviewing all the relevant related CVEs and their ticket information, make an
overall assessment on if the CVE in question is likely to be valid or invalid. Factor in
how many related CVEs were considered valid or invalid, and the strength of the
developer reasoning.
4. In the <OUTPUT_FORMAT > tags, provide a detailed explanation for why you judged
the CVE to be valid or invalid based on the related CVEs and tickets . Cite specific related
CVEs and developer comments as appropriate.
5. In the <OUTPUT_FORMAT > tags, state your final determination on if the CVE
vulnerability is valid or invalid.
Important: Your validity determination should be based ONLY on the related CVEs and
tickets provided. Do not use any other information sources. If there is not enough
information in the related CVEs and tickets to make a confident determination, say so.
<OUTPUT_FORMAT >
The output should be Json format . the example output:
{
" Decision ": valid or invalid vulnerability.
" Reason ": Detailed the reason of valid or invalid vulnerability.
" Type ": the reason type of your decision, for example, path does not exist, library
doesn't used. It should be in 5 words.
" Inference Bug ": the relevant bug ids in the provided
<RELATED_CVES_AND_TICKETS> tag which help to make the decision .
}
</ OUTPUT_FORMAT > """
```

The following is a second example muted prompt corresponding to the fourth thinking paradigm listed above (Critical Thinking):

```
REFACT_SYSTEM_2 = """ You are working in SAP and have strong experience in
security analysis.
Your task is to determine if a given CVE vulnerability is valid or invalid based on
information from related CVEs and their associated Bugzilla tickets . """
REFACT_TEMPLATE_2 = """ You have been tasked with determining whether a given
CVE vulnerability is valid or invalid. To make this assessment , you will need to critically
examine the details of the CVE in question as well as information from related CVEs and
their associated Bugzilla tickets .
Here are the key inputs you will be working with :
<CVE >
{{ cve_info }}
The detected vulnerability library in our production : {{ detected_lib }}
The detected vulnerability path in our production : {{ detected_path }}
</CVE >
This is the CVE vulnerability you need to assess the validity of. Review the details
carefully, paying close attention to the affected product / library, versions, and
```

-continued

```
- If it affects the same libraries/paths as valid related CVEs, it is likely valid, unless
there are mitigating factors
5. Based on the details of the CVE and the context from related CVEs, decide if you
believe the CVE is valid or invalid.
</ scratchpad >
After thinking through the problem, provide your final answer inside
<OUTPUT_FORMAT > tags.
Explain your reasoning, referencing key details of the CVE and the most relevant related
CVEs and tickets.
<OUTPUT_FORMAT >
The output should be Json format. the example output:

{
" Decision ": valid or invalid vulnerability.
" Reason ": Detailed the reason of valid or invalid vulnerability.
" Type ": the reason type of your decision, for example, path does not exist, library
doesn't used. It should be in 5 words.
" Inference Bug ": the relevant bug ids in the provided
<RELATED_CVES_AND_TICKETS> tag which help to make the decision.
}
</ OUTPUT_FORMAT > """
```

Example Preliminary Decisions

As described above, an AI agent (e.g., 250) can separately prompt the GenAI model with a plurality of decision prompts to generate a plurality of preliminary decisions on validity of the vulnerability report. Each decision prompt can be generated using a selected muted prompt or the meta-prompt as a prompt template, populated with relevant contextual information such as the identified vulnerable library and its path (e.g., {detected_lib} and {detected_path}, the vulnerability summary (e.g., {cve_info}), and the tickets summary (e.g., {bugs_info}), as described above.

For each decision prompt, the GenAI model can generate a response (preliminary decision) according to the instructed output format. As illustrated in the above examples, the response generated by the GenAI model can be organized as a Json object including not only a binary classification (e.g., "decision": "valid" or invalid") for the vulnerability report, but also the underlying reason (e.g., "reason") in making such classification, a list of relevant bug reports (or "references") from which the GenAI found support for the classification (e.g., "Inference Bug"), among other information. To illustrate, exemplary responses (preliminary decisions) generated by the GenAI model using the meta-prompt and four muted prompts described above are listed below.

```
{
    "decision": "invalid vulnerability",
    "reason": "The CVE-0000-11111 vulnerability is related to the xerces-c++x.y.z
library, which has been previously flagged in SAP HANA but determined to be invalid due
to the specific usage context in SAP HANA. The SDQ/IM Platform does not use HTTP
access, and the vulnerability does not pose a risk.",
    "reason_type": "context-specific usage",
    "confidence": 5,
    "inference_bug": "123456, 123457, 123458"
} // Preliminary decision using the meta-prompt (META_SYSTEM)
{
    "decision": "valid",
    "reason": "The CVE-0000-11111 describes a use-after-free vulnerability in xerces-
c++x.y.z versions xxx.yyy.zzz to xxx.yyy.vvv, which is different from the issues described
in the related CVEs. The related CVEs (CVE-2012-0880, CVE-2023-37536, CVE-2018-
1311) were marked as invalid due to different reasons such as the absence of HTTP access
or incorrect vulnerability reports. However, CVE-0000-11111 specifically addresses a use-
after-free issue in the XML parser, which is a valid concern and has been fixed in version
xxx.yyy.kkk.",
    "reason_type": "different vulnerability type",
    "confidence": 4,
    "inference_bug": "123456, 123457, 123458"
} // Preliminary decision using the first muted prompt (REFACT_SYSTEM_1)
{
    "decision": "valid",
    "reason": "The CVE-0000-11111 describes a use-after-free vulnerability in xerces-
c++x.y.z versions xxx.yyy.zzz to xxx.yyy.vvv, which is confirmed by the provided details
and the fix in version xxx.yyy.kkk. The related CVEs and Bugzilla tickets (CVE-2012-
0880, CVE-2023-37536, CVE-2018-1311) were marked as invalid due to different reasons,
such as the specific functionality not being used or the vulnerability not posing a risk to the
platform. However, these do not directly contradict the validity of CVE-0000-11111,
which has a clear description, impact, and mitigation steps.",
    "reason_type": "clear description and fix",
    "confidence": 4,
    "inference_bug": "123456, 123457, 123458"
} // Preliminary decision using the second muted prompt (REFACT_SYSTEM_2)
{
    "decision": "valid",
    "reason": "The CVE-0000-11111 describes a use-after-free vulnerability in xerces-
```

-continued c++x.y.z versions xxx.yyy.zzz to xxx.yyy.vvv, which is confirmed by the provided details and the fix in version xxx.yyy.kkk. The related CVEs and Bugzilla tickets indicate that similar vulnerabilities in the same library were previously marked as invalid due to specific conditions not being met in the SAP environment. However, the described vulnerability in CVE-0000-11111 is distinct and has been addressed by the Apache project, confirming its validity.",
   "reason_type": "distinct vulnerability confirmed fix",
   "confidence": 4,
   "inference_bug": "123456, 123457, 123458"
} // Preliminary decision using the third muted prompt (REFACT_SYSTEM_3)
{
   "decision": "invalid",
   "reason": "The related CVEs (CVE-2012-0880, CVE-2023-37536, CVE-2018-1311) affecting the same library (xerces-c++x.y.z) and detected in the same path (a_b.tar/c/d.so) were all marked as invalid. The developer comments indicated that the vulnerabilities did not pose a risk to the platform due to the specific usage of the library.",
   "reason_type": "library not used",
   "confidence": 5,
   "inference_bug": "123456, 123457, 123458"
} // Preliminary decision using the fourth muted prompt (REFACT_SYSTEM_4)

Example Adjudication

As described above, an adjudicator (e.g., 160 or 260) can use a majority-voting mechanism to reach a final decision on validity of the vulnerability report. In some examples, the majority-voting can be implemented by calculating a weighted sum of the preliminary decisions. For example, for each decision prompt (which can be based on a meta-prompt or a muted prompt), the GenAI model generates a binary classification (valid or invalid) along with supporting rationale and references (inference bugs) to the identified relevant bug reports. The weight assigned to a preliminary decision can be proportional to the number of references linked to that decision. These weighted decisions can then be aggregated to generate the final decision. In one specific example, the final decision $D_{final}$ can be calculated using the formular below:

$$D_{final} = \frac{1}{N}\sum_{i=1}^{N}\frac{I_i}{K}\times D_i$$

Here, N is the number of decision prompts (e.g., the number of muted prompts and the meta-prompt that were used to generate the preliminary decisions), $I_i$ is the number of inference bugs (i.e., relevant bug reports identified for the i-th decision prompt, $D_i$ is the binary classification for the i-th decision prompt (e.g., 1 for valid, −1 for invalid), and K is the total number of relevant bug reports retrieved based on the detected path and library.

According to the above formula, the weight for a particular preliminary decision is determined based on the number of inference bugs ($I_i$), among the set of relevant bug reports (total K), identified by the GenAI model as supporting that preliminary decision.

The final decision $D_{final}$ is normalized in a range [−1, 1], which can be divided into three non-overlapping sub-ranges, based on an upper threshold (U) and a lower threshold (L), which can be predefined values between −1 and 1. The vulnerability report can be adjudicated to be valid if $D_{final}$ falls in the sub-range between U and 1, or invalid if $D_{final}$ falls in the sub-range between −1 and L. On the other hand, if $D_{final}$ falls in the sub-range between L and U, the validity of the vulnerability report can be deemed to be indeterministic. Thus, the trichotomy of the full range into three sub-ranges can aggregate the binary classifications of preliminary decisions into a final decision that has three possible outcomes: valid, invalid, or indeterministic. In one specific example, U can be set to 0 and L can be set to −0.5. Other threshold values can also be used.

Using the five preliminary decisions (N=5) listed in the previous section as an example, suppose K=5 (i.e., a total of five relevant bug reports). Three of the preliminary decisions classify the vulnerability report as valid, whereas the other two preliminary decisions classify it as invalid. Because each preliminary decision lists three inference bugs ("313774, 315333, 283252"), the weight for each preliminary decision is 3/5. Thus, the final decision can be calculated as $D_{final}$=0.12. Thus, the vulnerability report can be decided to be valid (suppose U=0 and L=−0.5).

As another example, suppose N=5 decision prompts are used (e.g., based on four muted prompts and one meta-prompt), and K=5 relevant bug reports are retrieved (e.g., bug-1, bug-2, bug-3, bug-4, bug-5). Additionally, suppose the following preliminary decisions and weights are obtained: Decision 1 is "invalid" ($D_1$=−1), weight $I_1/K$=2/5 because there are two inference bugs (e.g., bug-2 and bug-3); Decision 2 is "valid" ($D_2$=1), weight $I_2/K$=3/5 because there are three inference bugs (e.g., bug-1, bug-2, and bug-3); Decision 3 is "invalid" ($D_3$=−1), weight $I_3/K$=4/5 because there are four inference bugs (e.g., bug-1, bug-3, bug-4, and bug-5); Decision 4 is "valid" ($D_4$=1), weight $I_4/K$=5/5 because there are five inference bugs (e.g., bug-1, bug-2, bug-3, bug-4, and bug-5); and Decision 5 is "valid" ($D_5$=1), weight $I_5/K$=0/5 because no inference bug is identified. Accordingly, the final decision is calculated as $D_{final}$=0.08. Thus, the vulnerability report can be decided to be valid (suppose U=0 and L=−0.5).

Example Experimental Results

To evaluate the automated software vulnerability assessment system disclosed herein, an experiment was conducted using a dataset comprising 1,846 historical vulnerability reports ("samples"). These samples were matched with corresponding Bugzilla tickets, as summarized in table 710 of FIG. 7. The dataset includes attributes of publicly known vulnerabilities identified by their CVE identifiers. Out of the total samples, 1,683 were classified as invalid, and only 163 were deemed valid, indicating that approximately 91% of security Bugzilla tickets are unnecessary, which would result in significant resource wastage and inefficiencies in vulnerability tracking.

The experimental evaluation employed the disclosed method to classify these vulnerability reports as valid, invalid, or indeterministic based on the normalized decision parameter $D_{final}$. Table 720 of FIG. 7 presents the results for using various numbers of decision prompts N (e.g., N=1, 3, or 5). For those samples that a valid/invalid decision can be made (excluding the indeterministic samples), the classification accuracy was assessed using precision and recall metrics.

In table 720, VV represents cases where the input vulnerability is valid, and the method correctly assesses it as valid; VI denotes cases where the input vulnerability is valid, but the method incorrectly assesses it as invalid; IV represents cases where the input vulnerability is invalid, but the method incorrectly assesses it as valid; and II denotes cases where the input vulnerability is invalid, and the method correctly assesses it as invalid. It is important to minimize VI to avoid rejecting valid vulnerabilities, which could lead to unaddressed security risks. Conversely, it is important to maximize II which ensures that invalid vulnerabilities are correctly identified, thereby reducing unnecessary efforts and improving resource efficiency in handling vulnerability reports. In the depicted example, the upper threshold U is set to 0 and the lower threshold L is set to –0.5 to balance between risks (e.g., introducing VI) and enhancing efficiency (e.g., maximizing II).

As shown, with N=5, the disclosed method achieved a precision of 99.26% and a recall of 85.05%. Under this configuration, the model assessed 946 out of 1,846 Bugzilla tickets as invalid (comprising 939 correctly classified invalid tickets and 7 misclassified valid tickets), thus they do not open tickets for tracking. Consequently, only 900 tickets (including 621 indeterministic tickets, 114 correctly classified valid tickets, and 165 misclassified invalid tickets) required opening tickets, substantially reducing the volume of invalid Bugzilla tickets.

Example Advantages

The technologies described herein offer several technical advantages that address critical challenges in automated vulnerability validation and enhance the efficiency of software vulnerability management processes.

One technical advantage is the integration of vulnerability knowledge distillation with expert knowledge distillation. By leveraging the analytical capabilities of the GenAI and contextual information extracted from bug tracking systems, the disclosed solution combines human expertise (e.g., embedded in the bug reports database) and automated analysis (e.g., extraction of vulnerability summary and tickets summary) to create a highly accurate and reliable vulnerability validation system. This hybrid approach mitigates the limitations of manual validation processes, which are often time-consuming and prone to human error, and ensures a more consistent evaluation of software vulnerabilities.

Another technical advantage lies in the innovative use of auto-prompt engineering to improve decision-making accuracy. The disclosed system employs multiple prompts with varied thinking paradigms to analyze vulnerability reports, enabling it to evaluate different perspectives on the same issue. This multi-prompt approach is further enhanced by a weighted majority voting mechanism, which aggregates preliminary decisions to reach a final decision on validity of the vulnerability report. The adjudication of multiple preliminary decisions addresses the technical challenge of handling complex and ambiguous vulnerability reports, improving the robustness of the final vulnerability assessment.

Moreover, the automated and real-time capabilities of the disclosed solution offer additional technical advantages. The disclosed system can process vulnerability reports in real-time by integrating with vulnerability detection tools (e.g., BDBA or the like). This real-time processing capability eliminates delays in vulnerability validation, enabling organizations to respond more quickly to security threats. Furthermore, by automating the classification of valid, invalid, and indeterministic vulnerabilities, the disclosed solution can significantly reduce the manual workload associated with validating large volumes of vulnerability reports, making it scalable for enterprise-level applications.

In sum, the disclosed technologies can improve efficiency of software vulnerability assessment by combining GenAI powered automation, real-time processing, and robust decision-making mechanisms, which streamline vulnerability validation workflows and optimize resource utilization.

Example Computing Systems

Figure 8:
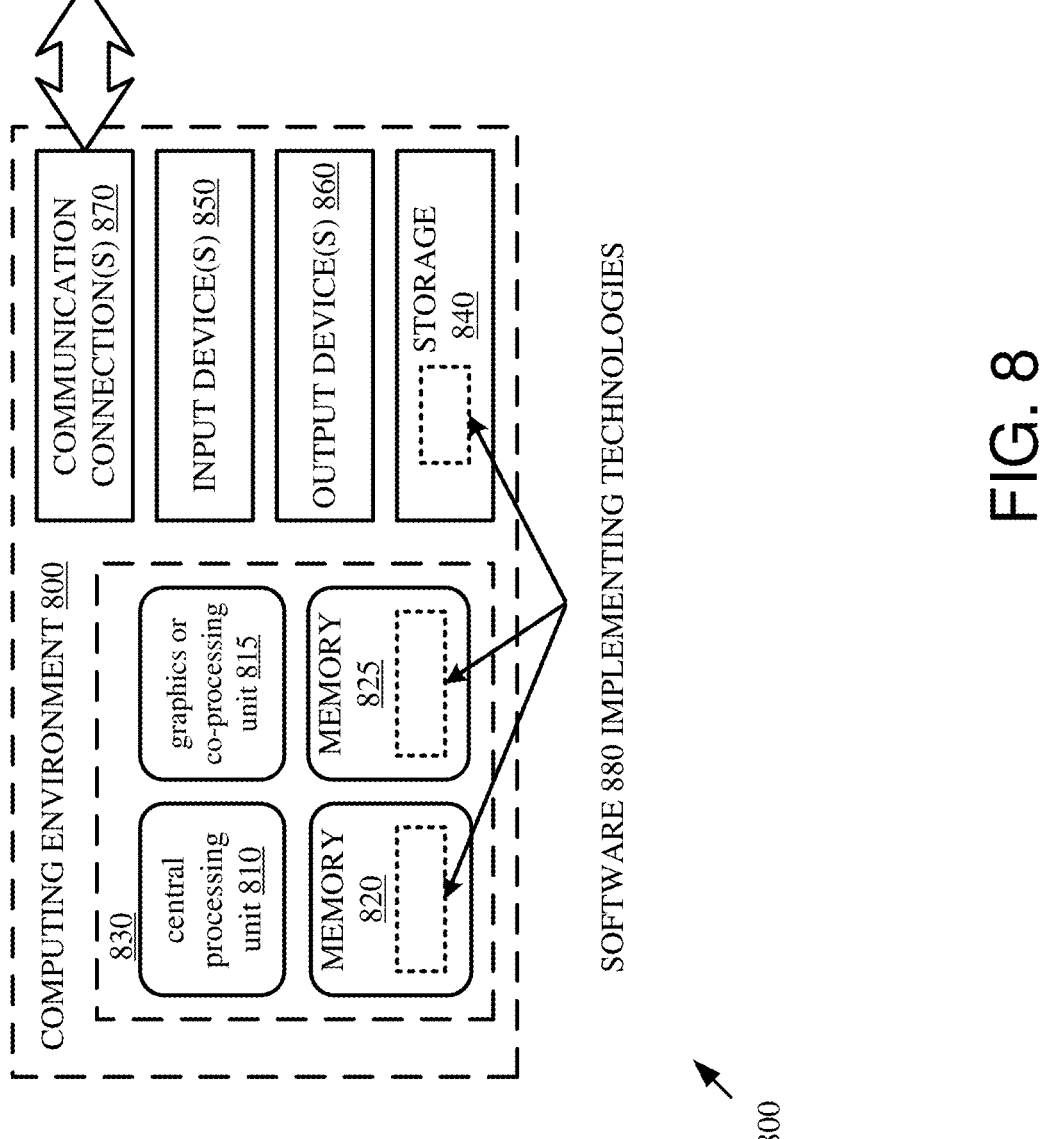
FIG. 8 is a block diagram of an example computing system in which described embodiments can be implemented.

FIG. 8 depicts an example of a suitable computing system 800 in which the described innovations can be implemented. The computing system 800 is not intended to suggest any limitation as to scope of use or functionality of the present disclosure, as the innovations can be implemented in diverse computing systems.

With reference to FIG. 8, the computing system 800 includes one or more processing units 810, 815 and memory 820, 825. In FIG. 8, this basic configuration 830 is included within a dashed line. The processing units 810, 815 can execute computer-executable instructions, such as for implementing the features described in the examples herein (e.g., the method 300). A processing unit can be a general-purpose central processing unit (CPU), processor in an application-specific integrated circuit (ASIC), or any other type of processor. In a multi-processing system, multiple processing units can execute computer-executable instructions to increase processing power. For example, FIG. 8 shows a central processing unit 810 as well as a graphics processing unit or co-processing unit 815. The tangible memory 820, 825 can be volatile memory (e.g., registers, cache, RAM), non-volatile memory (e.g., ROM, EEPROM, flash memory, etc.), or some combination of the two, accessible by the processing unit(s) 810, 815. The memory 820, 825 can store software 880 implementing one or more innovations described herein, in the form of computer-executable instructions suitable for execution by the processing unit(s) 810, 815.

A computing system 800 can have additional features. For example, the computing system 800 can include storage 840, one or more input devices 850, one or more output devices 860, and one or more communication connections 870, including input devices, output devices, and communication connections for interacting with a user. An interconnection mechanism (not shown) such as a bus, controller, or network can interconnect the components of the computing system 800. Typically, operating system software (not shown) can provide an operating environment for other software executing in the computing system 800, and coordinate activities of the components of the computing system 800.

The tangible storage 840 can be removable or non-removable, and includes magnetic disks, magnetic tapes or cassettes, CD-ROMs, DVDs, or any other medium which can be used to store information in a non-transitory way and which can be accessed within the computing system 800. The storage 840 can store instructions for the software implementing one or more innovations described herein.

The input device(s) 850 can be an input device such as a keyboard, mouse, pen, or trackball, a voice input device, a scanning device, touch device (e.g., touchpad, display, or the like) or another device that provides input to the computing system 800. The output device(s) 860 can be a display, printer, speaker, CD-writer, or another device that provides output from the computing system 800.

The communication connection(s) 870 can enable communication over a communication medium to another computing entity. The communication medium can convey information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components can include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example Cloud Computing Environment

Figure 9:
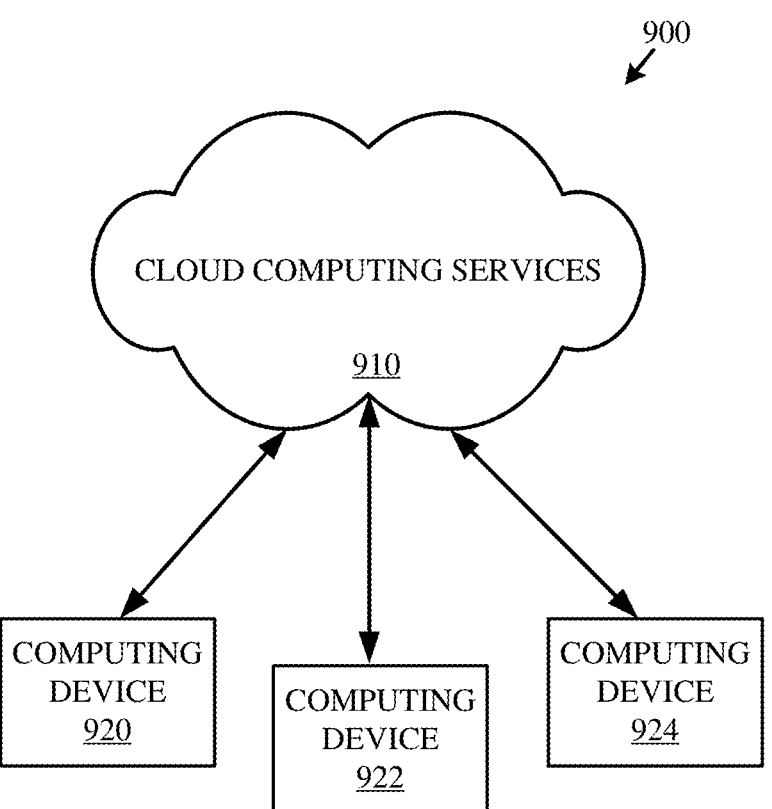
FIG. 9 is a block diagram of an example cloud computing environment that can be used in conjunction with the technologies described herein.

FIG. 9 depicts an example cloud computing environment 900 in which the described technologies can be implemented, including, e.g., the systems 120, 220 and other systems herein. The cloud computing environment 900 can include cloud computing services 910. The cloud computing services 910 can comprise various types of cloud computing resources, such as computer servers, data storage repositories, networking resources, etc. The cloud computing services 910 can be centrally located (e.g., provided by a data center of a business or organization) or distributed (e.g., provided by various computing resources located at different locations, such as different data centers and/or located in different cities or countries).

The cloud computing services 910 can be utilized by various types of computing devices (e.g., client computing devices), such as computing devices 920, 922, and 924. For example, the computing devices (e.g., 920, 922, and 924) can be computers (e.g., desktop or laptop computers), mobile devices (e.g., tablet computers or smart phones), or other types of computing devices. For example, the computing devices (e.g., 920, 922, and 924) can utilize the cloud computing services 910 to perform computing operations (e.g., data processing, data storage, and the like).

In practice, cloud-based, on-premises-based, or hybrid scenarios can be supported.

Example Implementations

In any of the examples herein, a software application (or "application") can take the form of a single application or a suite of a plurality of applications, whether offered as a service (SaaS), in the cloud, on premises, on a desktop, mobile device, wearable, or the like.

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

Although specific prompt templates are described above, it should be understood that these prompt templates are merely examples for illustration purposes, and different prompt templates can be used based on the principles described herein.

In any of the examples described herein, an operation performed in runtime or real-time means that the operation can be completed with negligible processing latency (e.g., the operation can be completed within 1 second, etc.).

Example Clauses

Any of the following example clauses can be implemented.

Clause 1. A computing system comprising: memory; one or more hardware processors coupled to the memory; and one or more computer readable storage media storing instructions that, when loaded into the memory, cause the one or more hardware processors to perform operations comprising: receiving a vulnerability report for a selected software, wherein the vulnerability report specifies a vulnerable library used by the selected software and a path of the vulnerable library within the selected software; generating a summary of the vulnerability report using a generative artificial intelligence (AI) model; retrieving, from a bug report database, a set of relevant bug reports specifying the vulnerable library; generating a synopsis for the set of relevant bug reports using the generative AI model; generating multiple preliminary decisions on validity of the vulnerability report using the generative AI model based on the summary of the vulnerability report and the synopsis for the set of relevant bug reports; and generating a final decision on validity of the vulnerability report based on the multiple preliminary decisions.

Clause 2. The computing system of clause 1, wherein generating the summary of the vulnerability report comprises: generating a vulnerability knowledge distillation prompt based on a first prompt template, wherein the first prompt template includes instructions for the generative AI model to extract, from the vulnerability report, vulnerability information of the vulnerability library used by the selected software; and prompting the generative AI model with the vulnerability knowledge distillation prompt.

Clause 3. The computing system of any one of clauses 1-2, wherein the retrieving comprises: searching the bug report database to identify a collection of bug reports for one or more historical software, wherein a bug report for a historical software specifies the vulnerability library used by the historical software and a path of the vulnerability library within the historical software; and identifying, from the collection of bug reports, the set of relevant bug reports, wherein the identifying comprises comparing the path of the vulnerable library within the selected software with the path of the vulnerability library within the historical software.

Clause 4. The computing system of clause 3, wherein the identifying further comprises: adding the bug report for the historical software to the set of relevant bug reports if (i) the path of the vulnerability library within the historical software contains the path of the vulnerable library within the selected software, and (ii) a count of bug reports in the set of relevant bug reports is smaller than a predefined number; and responsive to determining that the count of bug reports in the set of relevant bug reports is smaller than the predefined number after evaluating the collection of bug reports, iteratively comparing a sub-path of the vulnerable library within the selected software with the path of the vulnerability library within the historical software, wherein the sub-path is derived by removing a prefix from the path of the vulnerable library within the selected software.

Clause 5. The computing system of any one of clauses 1-4, wherein generating the synopsis for the set of relevant bug reports comprises: generating an expert knowledge distillation prompt based on a second prompt template, wherein the second prompt template includes instructions for the generative AI model to extract, from the set of relevant bug reports, summaries and validity classifications for the set of relevant bug reports; and prompting the generative AI model with the expert knowledge distillation prompt.

Clause 6. The computing system of any one of clauses 1-5, wherein generating multiple preliminary decisions on validity of the vulnerability report comprises: obtaining a plurality of muted prompts previously derived from a meta-prompt using the generative AI model based on a plurality of predefined thinking paradigms; and separately prompting the generative AI model using the plurality of muted prompts, wherein prompting the generative AI model using a muted prompt is configured to generate one of the multiple preliminary decisions.

Clause 7. The computing system of clause 6, wherein the meta-prompt and the plurality of muted prompts include instructions for the generative AI model to (i) classify the vulnerability report as valid or invalid based on analysis of the summary of the vulnerability report and the synopsis for the set of relevant bug reports, and (ii) generate a list of inference bugs which identify one or more relevant bug reports based on which the vulnerability report is classified as valid or invalid.

Clause 8. The computing system of any one of clauses 6-7, wherein generating the final decision on validity of the vulnerability report further comprises calculating a weighted sum of the multiple preliminary decisions.

Clause 9. The computing system of clause 8, wherein calculating the weighted sum comprises determining weights for the multiple preliminary decisions, wherein a weight for a preliminary decision is determined based on how many relevant bug reports, among the set of relevant bug reports, are found by the generative AI model to support the preliminary decision.

Clause 10. The computing system of any one of clauses 8-9, wherein the weighted sum is in a range divided into three non-overlapping sub-ranges, wherein the final decision indicates (i) the vulnerability report is valid, (ii) the vulnerability report is invalid, or (iii) validity of the vulnerability report is indeterministic, based on the sub-range into which the weighted sum falls.

Clause 11. A computer-implemented method comprising: receiving a vulnerability report for a selected software, wherein the vulnerability report specifies a vulnerable library used by the selected software and a path of the vulnerable library within the selected software; generating a summary of the vulnerability report using a generative artificial intelligence (AI) model; retrieving, from a bug report database, a set of relevant bug reports specifying the vulnerable library; generating a synopsis for the set of relevant bug reports using the generative AI model; generating multiple preliminary decisions on validity of the vulnerability report using the generative AI model based on the summary of the vulnerability report and the synopsis for the set of relevant bug reports; and generating a final decision on validity of the vulnerability report based on the multiple preliminary decisions.

Clause 12. The computer-implemented method of clause 11, wherein generating the summary of the vulnerability report comprises: generating a vulnerability knowledge distillation prompt based on a first prompt template, wherein the first prompt template includes instructions for the generative AI model to extract, from the vulnerability report, vulnerability information of the vulnerability library used by the selected software; and prompting the generative AI model with the vulnerability knowledge distillation prompt.

Clause 13. The computer-implemented method of any one of clauses 11-12, wherein the retrieving comprises: searching the bug report database to identify a collection of bug reports for one or more historical software, wherein a bug report for a historical software specifies the vulnerability library used by the historical software and a path of the vulnerability library within the historical software; and identifying, from the collection of bug reports, the set of relevant bug reports, wherein the identifying comprises comparing the path of the vulnerable library within the selected software with the path of the vulnerability library within the historical software.

Clause 14. The computer-implemented method of clause 13, wherein the identifying further comprises: adding the bug report for the historical software to the set of relevant bug reports if (i) the path of the vulnerability library within the historical software contains the path of the vulnerable library within the selected software, and (ii) a count of bug reports in the set of relevant bug reports is smaller than a predefined number; and responsive to determining that the count of bug reports in the set of relevant bug reports is smaller than the predefined number after evaluating the collection of bug reports, iteratively comparing a sub-path of the vulnerable library within the selected software with the path of the vulnerability library within the historical software, wherein the sub-path is derived by removing a prefix from the path of the vulnerable library within the selected software.

Clause 15. The computer-implemented method of any one of clauses 11-14, wherein generating the synopsis for the set of relevant bug reports comprises: generating an expert knowledge distillation prompt based on a second prompt template, wherein the second prompt template includes instructions for the generative AI model to extract, from the set of relevant bug reports, summaries and validity classifications for the set of relevant bug reports; and prompting the generative AI model with the expert knowledge distillation prompt.

Clause 16. The computer-implemented method of any one of clauses 11-15, wherein generating multiple preliminary decisions on validity of the vulnerability report comprises: obtaining a plurality of muted prompts previously derived from a meta-prompt using the generative AI model based on a plurality of predefined thinking paradigms; and separately prompting the generative AI model using the plurality of muted prompts, wherein prompting the generative AI model using a muted prompt is configured to generate one of the multiple preliminary decisions.

Clause 17. The computer-implemented method of clause 16, wherein the meta-prompt and the plurality of muted prompts include instructions for the generative AI model to (i) classify the vulnerability report as valid or invalid based on analysis of the summary of the vulnerability report and the synopsis for the set of relevant bug reports, and (ii) generate a list of inference bugs which identify one or more relevant bug reports based on which the vulnerability report is classified as valid or invalid.

Clause 18. The computer-implemented method of any one of clauses 16-17, wherein generating the final decision on validity of the vulnerability report further comprises calculating a weighted sum of the multiple preliminary decisions.

Clause 19. The computer-implemented method of clause 18, wherein calculating the weighted sum comprises determining weights for the multiple preliminary decisions, wherein a weight for a preliminary decision is determined based on how many relevant bug reports, among the set of relevant bug reports, are found by the generative AI model to support the preliminary decision.

Clause 20. One or more non-transitory computer-readable media having encoded thereon computer-executable instructions causing one or more processors to perform a method, the method comprising: receiving a vulnerability report for a selected software, wherein the vulnerability report specifies a vulnerable library used by the selected software and a path of the vulnerable library within the selected software; generating a summary of the vulnerability report using a generative artificial intelligence (AI) model; retrieving, from a bug report database, a set of relevant bug reports specifying the vulnerable library; generating a synopsis for the set of relevant bug reports using the generative AI model; generating multiple preliminary decisions on validity of the vulnerability report using the generative AI model based on the summary of the vulnerability report and the synopsis for the set of relevant bug reports; and generating a final decision on validity of the vulnerability report based on the multiple preliminary decisions.

The technologies from any clause can be combined with the technologies described in any one or more of the other clauses.

In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
memory;
one or more hardware processors coupled to the memory; and
one or more computer readable storage media storing instructions that, when loaded into the memory, cause the one or more hardware processors to perform operations comprising:
receiving a vulnerability report for a selected software, wherein the vulnerability report specifies a vulnerable library used by the selected software and a path of the vulnerable library within the selected software;
generating a summary of the vulnerability report using a generative artificial intelligence (AI) model;
retrieving, from a bug report database, a set of relevant bug reports specifying the vulnerable library;
generating a synopsis for the set of relevant bug reports using the generative AI model;
generating multiple preliminary decisions on validity of the vulnerability report using the generative AI model based on the summary of the vulnerability report and the synopsis for the set of relevant bug reports; and
generating a final decision on validity of the vulnerability report based on the multiple preliminary decisions.

2. The computing system of claim 1, wherein generating the summary of the vulnerability report comprises:
generating a vulnerability knowledge distillation prompt based on a first prompt template, wherein the first prompt template includes instructions for the generative AI model to extract, from the vulnerability report, vulnerability information of the vulnerability library used by the selected software; and
prompting the generative AI model with the vulnerability knowledge distillation prompt.

3. The computing system of claim 1, wherein the retrieving comprises:

searching the bug report database to identify a collection of bug reports for one or more historical software, wherein a bug report for a historical software specifies the vulnerability library used by the historical software and a path of the vulnerability library within the historical software; and identifying, from the collection of bug reports, the set of relevant bug reports, wherein the identifying comprises comparing the path of the vulnerable library within the selected software with the path of the vulnerability library within the historical software.

4. The computing system of claim 3, wherein the identifying further comprises:

adding the bug report for the historical software to the set of relevant bug reports if (i) the path of the vulnerability library within the historical software contains the path of the vulnerable library within the selected software, and (ii) a count of bug reports in the set of relevant bug reports is smaller than a predefined number; and responsive to determining that the count of bug reports in the set of relevant bug reports is smaller than the predefined number after evaluating the collection of bug reports, iteratively comparing a sub-path of the vulnerable library within the selected software with the path of the vulnerability library within the historical software, wherein the sub-path is derived by removing a prefix from the path of the vulnerable library within the selected software.

5. The computing system of claim 1, wherein generating the synopsis for the set of relevant bug reports comprises:

generating an expert knowledge distillation prompt based on a second prompt template, wherein the second prompt template includes instructions for the generative AI model to extract, from the set of relevant bug reports, summaries and validity classifications for the set of relevant bug reports; and prompting the generative AI model with the expert knowledge distillation prompt.

6. The computing system of claim 1, wherein generating multiple preliminary decisions on validity of the vulnerability report comprises:

obtaining a plurality of muted prompts previously derived from a meta-prompt using the generative AI model based on a plurality of predefined thinking paradigms; and separately prompting the generative AI model using the plurality of muted prompts, wherein prompting the generative AI model using a muted prompt is configured to generate one of the multiple preliminary decisions.

7. The computing system of claim 6, wherein the meta-prompt and the plurality of muted prompts include instructions for the generative AI model to (i) classify the vulnerability report as valid or invalid based on analysis of the summary of the vulnerability report and the synopsis for the set of relevant bug reports, and (ii) generate a list of inference bugs which identify one or more relevant bug reports based on which the vulnerability report is classified as valid or invalid.

8. The computing system of claim 6, wherein generating the final decision on validity of the vulnerability report further comprises calculating a weighted sum of the multiple preliminary decisions.

9. The computing system of claim 8, wherein calculating the weighted sum comprises determining weights for the multiple preliminary decisions, wherein a weight for a preliminary decision is determined based on how many relevant bug reports, among the set of relevant bug reports, are found by the generative AI model to support the preliminary decision.

10. The computing system of claim 8, wherein the weighted sum is in a range divided into three non-overlapping sub-ranges, wherein the final decision indicates (i) the vulnerability report is valid, (ii) the vulnerability report is invalid, or (iii) validity of the vulnerability report is indeterministic, based on the sub-range into which the weighted sum falls.

11. A computer-implemented method comprising:

receiving a vulnerability report for a selected software, wherein the vulnerability report specifies a vulnerable library used by the selected software and a path of the vulnerable library within the selected software;

generating a summary of the vulnerability report using a generative artificial intelligence (AI) model;

retrieving, from a bug report database, a set of relevant bug reports specifying the vulnerable library;

generating a synopsis for the set of relevant bug reports using the generative AI model;

generating multiple preliminary decisions on validity of the vulnerability report using the generative AI model based on the summary of the vulnerability report and the synopsis for the set of relevant bug reports; and generating a final decision on validity of the vulnerability report based on the multiple preliminary decisions.

12. The computer-implemented method of claim 11, wherein generating the summary of the vulnerability report comprises:

generating a vulnerability knowledge distillation prompt based on a first prompt template, wherein the first prompt template includes instructions for the generative AI model to extract, from the vulnerability report, vulnerability information of the vulnerability library used by the selected software; and prompting the generative AI model with the vulnerability knowledge distillation prompt.

13. The computer-implemented method of claim 11, wherein the retrieving comprises:

searching the bug report database to identify a collection of bug reports for one or more historical software, wherein a bug report for a historical software specifies the vulnerability library used by the historical software and a path of the vulnerability library within the historical software; and identifying, from the collection of bug reports, the set of relevant bug reports, wherein the identifying comprises comparing the path of the vulnerable library within the selected software with the path of the vulnerability library within the historical software.

14. The computer-implemented method of claim 13, wherein the identifying further comprises:

adding the bug report for the historical software to the set of relevant bug reports if (i) the path of the vulnerability library within the historical software contains the path of the vulnerable library within the selected software, and (ii) a count of bug reports in the set of relevant bug reports is smaller than a predefined number; and responsive to determining that the count of bug reports in the set of relevant bug reports is smaller than the predefined number after evaluating the collection of bug reports, iteratively comparing a sub-path of the vulnerable library within the selected software with the path of the vulnerability library within the historical software, wherein the sub-path is derived by removing a prefix from the path of the vulnerable library within the selected software.

15. The computer-implemented method of claim 11, wherein generating the synopsis for the set of relevant bug reports comprises:

generating an expert knowledge distillation prompt based on a second prompt template, wherein the second prompt template includes instructions for the generative AI model to extract, from the set of relevant bug reports, summaries and validity classifications for the set of relevant bug reports; and prompting the generative AI model with the expert knowledge distillation prompt.

16. The computer-implemented method of claim 11, wherein generating multiple preliminary decisions on validity of the vulnerability report comprises:

obtaining a plurality of muted prompts previously derived from a meta-prompt using the generative AI model based on a plurality of predefined thinking paradigms; and separately prompting the generative AI model using the plurality of muted prompts, wherein prompting the generative AI model using a muted prompt is configured to generate one of the multiple preliminary decisions.

17. The computer-implemented method of claim 16, wherein the meta-prompt and the plurality of muted prompts include instructions for the generative AI model to (i) classify the vulnerability report as valid or invalid based on analysis of the summary of the vulnerability report and the synopsis for the set of relevant bug reports, and (ii) generate a list of inference bugs which identify one or more relevant bug reports based on which the vulnerability report is classified as valid or invalid.

18. The computer-implemented method of claim 16, wherein generating the final decision on validity of the vulnerability report further comprises calculating a weighted sum of the multiple preliminary decisions.

19. The computer-implemented method of claim 18, wherein calculating the weighted sum comprises determining weights for the multiple preliminary decisions, wherein a weight for a preliminary decision is determined based on how many relevant bug reports, among the set of relevant bug reports, are found by the generative AI model to support the preliminary decision.

20. One or more non-transitory computer-readable media having encoded thereon computer-executable instructions causing one or more processors to perform a method, the method comprising:

receiving a vulnerability report for a selected software, wherein the vulnerability report specifies a vulnerable library used by the selected software and a path of the vulnerable library within the selected software;

generating a summary of the vulnerability report using a generative artificial intelligence (AI) model;

retrieving, from a bug report database, a set of relevant bug reports specifying the vulnerable library;

generating a synopsis for the set of relevant bug reports using the generative AI model;

generating multiple preliminary decisions on validity of the vulnerability report using the generative AI model based on the summary of the vulnerability report and the synopsis for the set of relevant bug reports; and generating a final decision on validity of the vulnerability report based on the multiple preliminary decisions.

\* \* \* \* \*